(12) United States Patent
Asano

(10) Patent No.: US 9,013,428 B2
(45) Date of Patent: Apr. 21, 2015

(54) ELECTRONIC DEVICE AND HANDWRITTEN DOCUMENT CREATION METHOD

(71) Applicant: Kabushiki Kaisha Toshiba, Minato-ku, Tokyo (JP)

(72) Inventor: Mieko Asano, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 145 days.

(21) Appl. No.: 13/674,728

(22) Filed: Nov. 12, 2012

(65) Prior Publication Data

US 2013/0314337 A1 Nov. 28, 2013

(30) Foreign Application Priority Data

May 25, 2012 (JP) .................................. 2012-119776

(51) Int. Cl.
*G06F 3/041* (2006.01)
*G06K 9/22* (2006.01)
*G06F 3/0488* (2013.01)
*G06K 9/00* (2006.01)

(52) U.S. Cl.
CPC ................ *G06F 3/041* (2013.01); *G06K 9/222* (2013.01); *G06F 3/04883* (2013.01); *G06K 9/00402* (2013.01)

(58) Field of Classification Search
CPC combination set(s) only.
See application file for complete search history.

(56) References Cited

U.S. PATENT DOCUMENTS

| 4,727,588 A | 2/1988 | Fox et al. |
| 5,698,822 A * | 12/1997 | Haneda et al. .............. 178/18.01 |
| 5,850,477 A | 12/1998 | Takada |
| 5,970,455 A | 10/1999 | Wilcox et al. |
| 7,567,238 B2 * | 7/2009 | Sugimoto et al. .............. 345/173 |
| 7,907,779 B2 * | 3/2011 | Kawamoto et al. ........... 382/187 |
| 2012/0242579 A1 * | 9/2012 | Chua .............................. 345/168 |
| 2013/0300675 A1 * | 11/2013 | Tsutsui et al. ................. 345/173 |

FOREIGN PATENT DOCUMENTS

| EP | 0176715 | 4/1986 |
| JP | 61-080478 | 4/1986 |
| JP | 08-185398 | 7/1996 |
| JP | 10-268996 | 10/1998 |
| JP | 11-306369 | 11/1999 |
| JP | 2001-175408 | 6/2001 |
| JP | 2001-312340 | 11/2001 |

OTHER PUBLICATIONS

Japanese First Office Action for corresponding Japanese Application No. 2012-119776, mailed Jan. 8, 2013, in 4 pages.

\* cited by examiner

*Primary Examiner* — Van Chow
(74) *Attorney, Agent, or Firm* — Knobbe, Martens, Olson & Bear LLP

(57) ABSTRACT

According to one embodiment, an electronic apparatus includes a touch-screen display, a memory, a display process module, and a change module. The memory is configured to store time-series information indicative of loci and an order of handwriting of a plurality of strokes handwritten on the touch-screen display. The display process module is configured to display loci corresponding to the plurality of strokes, on the touch-screen display, based on time-series information. The change module is configured to change time-series information in accordance with an editing operation to the plurality of strokes on the touch-screen display.

15 Claims, 15 Drawing Sheets

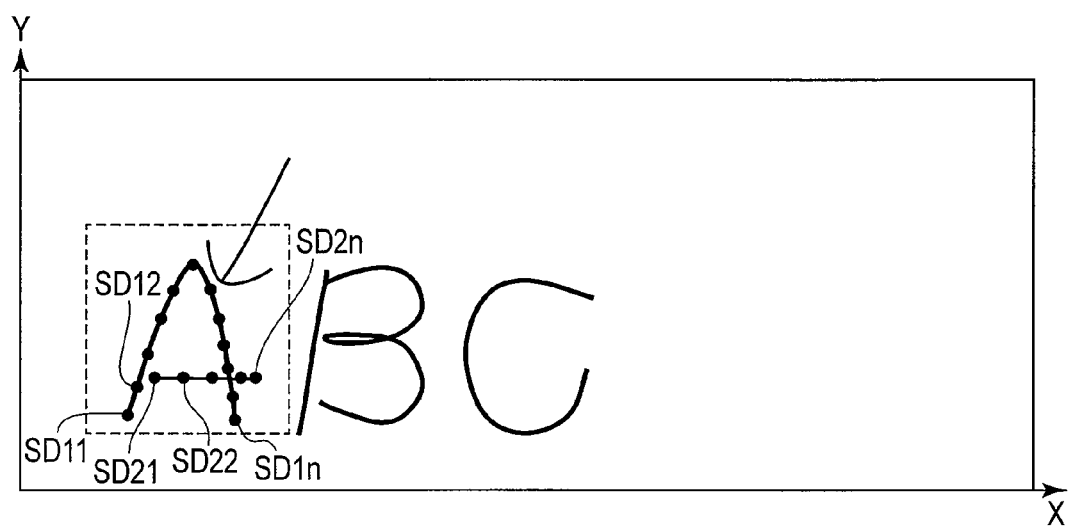
F I G. 3

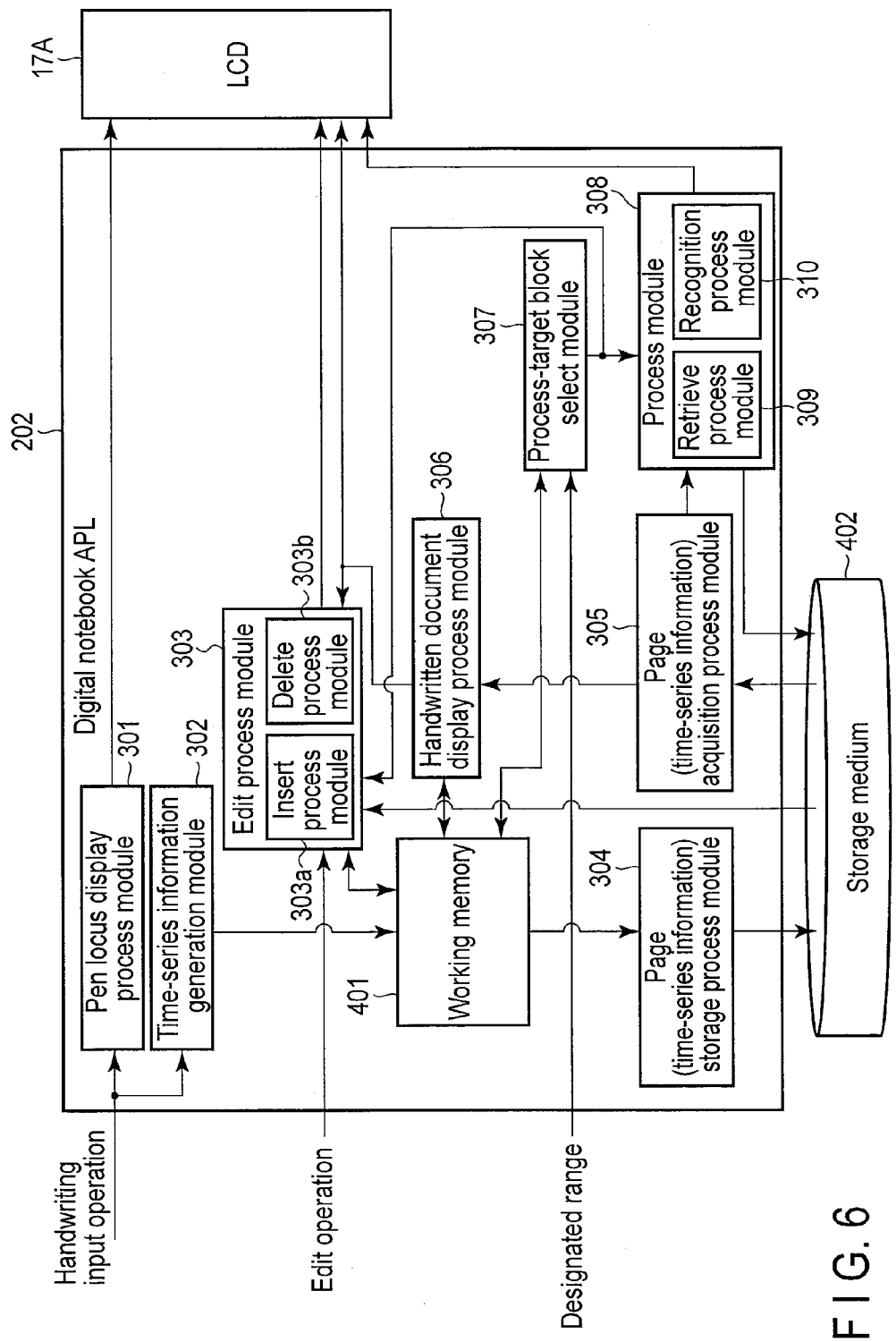
F I G. 6

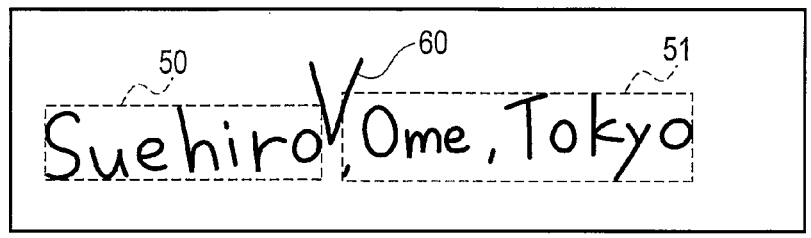
F I G. 12
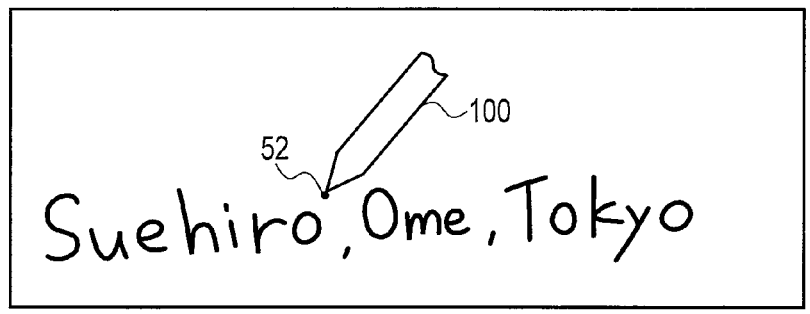
F I G. 13A
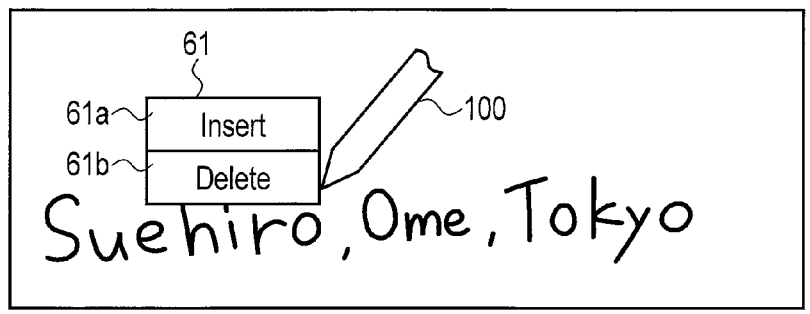
F I G. 13B
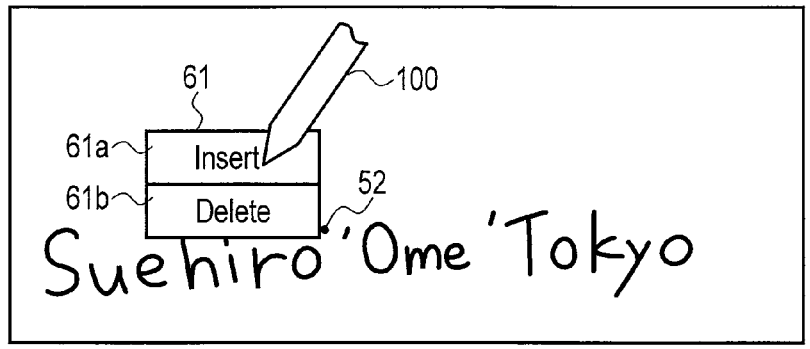
F I G. 13C

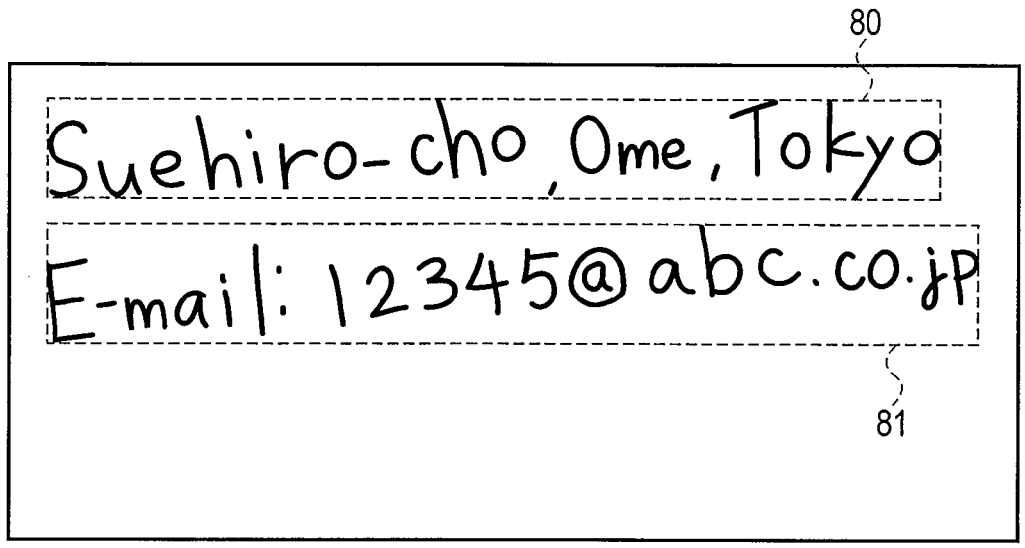
F I G. 16A
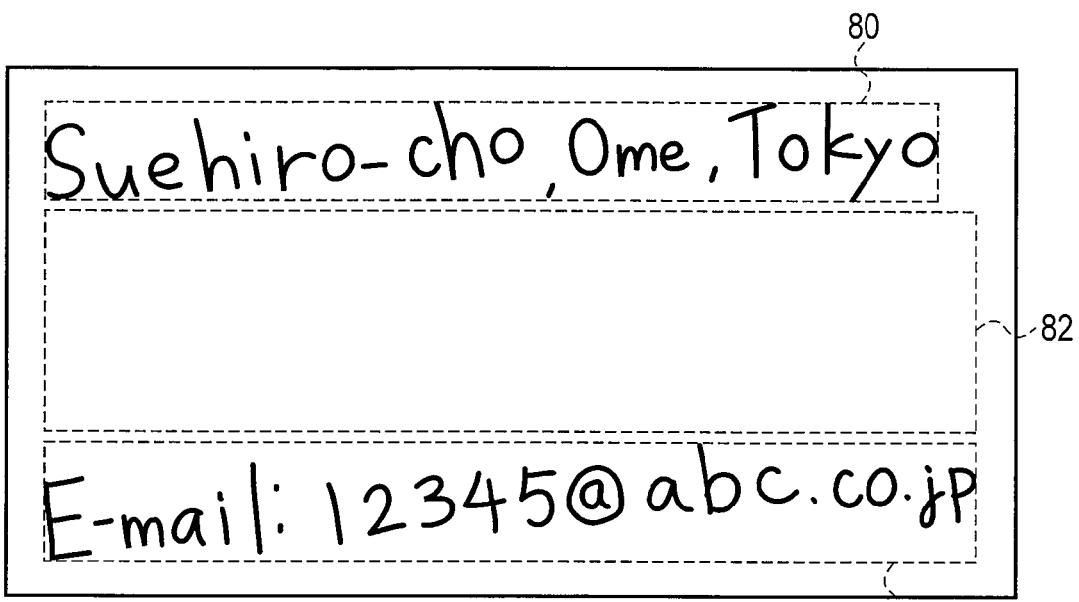
F I G. 16B

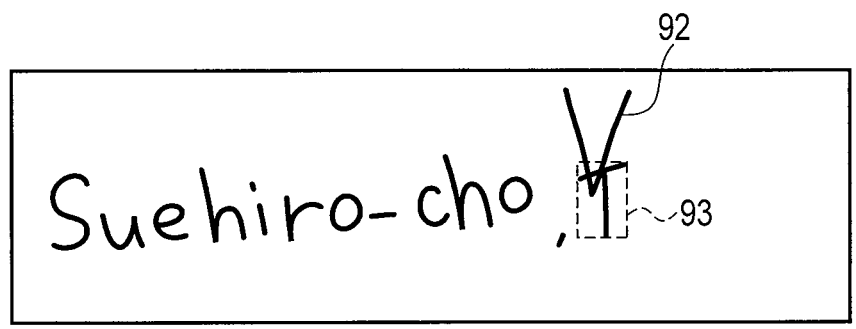
F I G. 20A
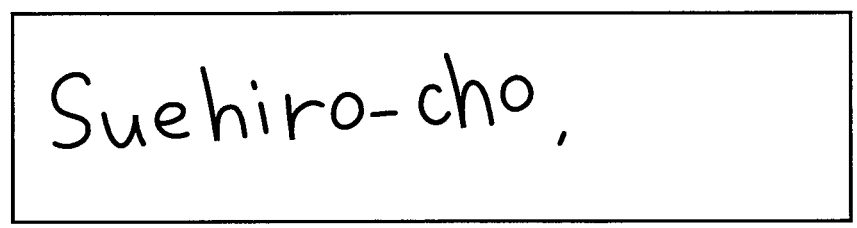
F I G. 20B

ELECTRONIC DEVICE AND HANDWRITTEN DOCUMENT CREATION METHOD

CROSS-REFERENCE TO RELATED APPLICATIONS

This application is based upon and claims the benefit of priority from Japanese Patent Application No. 2012-119776, filed May 25, 2012, the entire contents of which are incorporated herein by reference.

FIELD

Embodiments described herein relate generally to processing a handwritten document.

BACKGROUND

In recent years, various kinds of electronic devices, such as a tablet-type computer, a PDA (personal digital assistant) and a smartphone, have been developed. Most of these electronic devices include touch-screen displays for facilitating input operations by users.

By touching a menu or an object, which is displayed on the touch-screen display, by a finger or the like, the user can instruct a portable electronic device to execute a function which is associated with the menu or object.

However, most of existing electronic devices with touch-screen displays are consumer products which are designed to enhance operability on various media data such as video and music, and are not necessarily suitable for use in a business situation such as a meeting, a business negotiation or product development. Thus, paper-based pocket notebooks have still been widely used to record information by handwriting.

Electronic devices are expected to function as digital tools which can support a person's thinking activities or can make easier the re-use of materials such as documents which were created in the past. For example, in order to use the electronic device with the same feeling as a paper-based pocket notebook, a function, which enables easy edit of information that is recorded by handwriting, is expected.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a view illustrating an example of a handwritten document which is handwritten on a touch-screen display of the electronic device in the embodiment.

FIG. 6 is an exemplary block diagram illustrating a functional configuration of a digital notebook application program which is executed by the electronic device of the embodiment.

FIG. 12 is a view illustrating an example in which a blank area is set in the embodiment.

FIG. 13A, FIG. 13B and FIG. 13C are view illustrating an example in which a menu is displayed in the embodiment.

FIG. 16A and FIG. 16B are view illustrating an example in which a blank area is provided in a vertical direction (between lines) in the embodiment.

FIG. 20A and FIG. 20B are exemplary view for explaining the delete process in the embodiment.

DETAILED DESCRIPTION

Various embodiments will be described hereinafter with reference to the accompanying drawings.

In general, according to one embodiment, an electronic device comprises a touch-screen display, a memory, a display process module, and a change module. The memory is configured to store time-series information indicative of loci and an order of handwriting of a plurality of strokes handwritten on the touch-screen display. The display process module is configured to display loci corresponding to the plurality of strokes, on the touch-screen display, based on time-series information. The change module is configured to change time-series information in accordance with an editing operation to the plurality of strokes on the touch-screen display.

Figure 1:
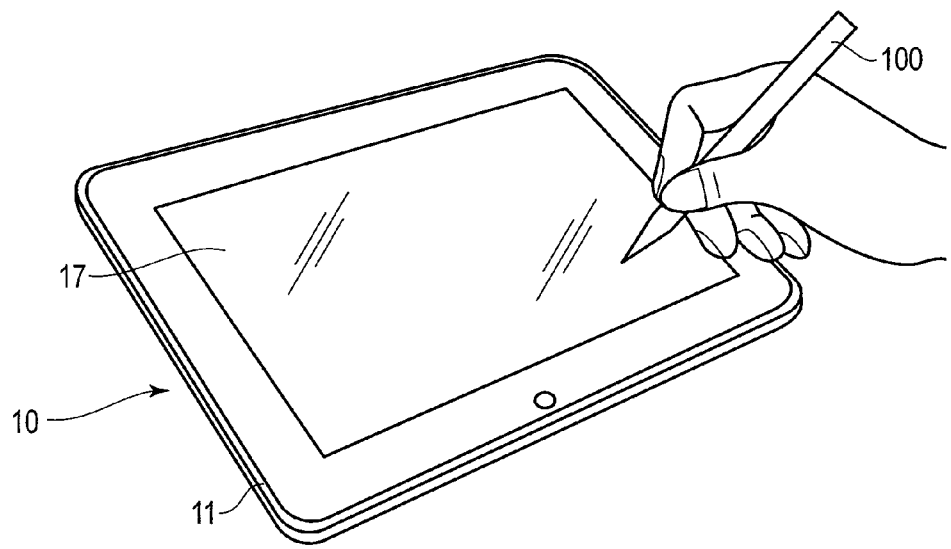
FIG. 1 is an exemplary perspective view illustrating an external appearance of an electronic device according to an embodiment.

FIG. 1 is a perspective view illustrating an external appearance of an electronic device according to an embodiment. The electronic device is, for instance, a pen-based portable electronic device which can execute a handwriting input by a pen or a finger. This electronic device may be realized as a tablet computer, a notebook-type personal computer, a smartphone, a PDA, etc. In the description below, the case is assumed that this electronic device is realized as a tablet computer 10. The tablet computer 10 is a portable electronic device which is also called "tablet" or "slate computer". As shown in FIG. 1, the tablet computer 10 includes a main body 11 and a touch-screen display 17. The touch-screen display 17 is attached such that the touch-screen display 17 is laid over the top surface of the main body 11.

The main body 11 has a thin box-shaped housing. In the touch-screen display 17, a flat-panel display and a sensor, which is configured to detect a touch position of a pen or a finger on the screen of the flat-panel display, are assembled. The flat-panel display may be, for instance, a liquid crystal display (LCD). As the sensor, for example, use may be made of an electrostatic capacitance-type touch panel, or an electromagnetic induction-type digitizer, and the sensor detects a position touched by the pen or finger, or a nearby position thereof. In the description below, the case is assumed that two kinds of sensors, namely a digitizer and a touch panel, are both assembled in the touch-screen display 17.

Each of the digitizer and the touch panel is provided in a manner to cover the screen of the flat-panel display. The touch-screen display 17 can detect not only a touch operation on the screen with use of a finger, but also a touch operation on the screen with use of a pen 100. The pen 100 may be, for instance, an electromagnetic-induction pen. The user can execute a handwriting input operation on the touch-screen display 17 by using an external object (pen 100 or finger). During the handwriting input operation, a locus of movement of the external object (pen 100 or finger) on the screen, that is, a locus (a trace of writing) of a stroke that is handwritten by the handwriting input operation, is displayed on the screen in real time. A locus of movement of the external object during a time in which the external object is in contact with the screen corresponds to one stroke. Usually, a handwritten document is composed of a set of many strokes corresponding to handwritten characters or graphics, that is, a set of many loci (traces of writing).

In the present embodiment, the handwritten document is stored in a storage medium not as image data but as time-series information indicative of coordinate series of the loci of strokes and the order relation between the strokes. Although the details of the time-series information will be described later with reference to FIG. 4, this time-series information means a set of time-series stroke data corresponding to a plurality of strokes. Each stroke data corresponds to one stroke, and includes coordinate data series (time-series coordinates) corresponding to plural points on the locus of this stroke. The order of arrangement of these stroke data corresponds to an order in which strokes are handwritten, that is, an order of strokes.

The tablet computer 10 has a function of reading out existing time-series information from the storage medium, and displaying on the screen a handwritten document corresponding to this time-series information, that is, the loci corresponding to a plurality of strokes indicated by this time-series information. Furthermore, the tablet computer 10 has an edit function of editing the loci (handwritten document) displayed on the screen. The edit function can insert a new locus in the loci (handwritten document) displayed on the screen, delete an existing locus, or move a locus, in accordance with an edit operation by the user.

In this embodiment, the time-series information (handwritten document) may be managed as one page or plural pages. In this case, the time-series information (handwritten document) may be divided in units of an area which falls within one screen, and thereby a piece of time-series information, which falls within one screen, may be stored as one page. Alternatively, the size of one page may be made variable. In this case, since the size of a page can be increased to an area which is larger than the size of one screen, a handwritten document of an area larger than the size of the screen can be handled as one page. When one whole page cannot be displayed on the display at a time, this page may be reduced in size and displayed, or a display target part in the page may be moved by vertical and horizontal scroll. Besides, pages may be reduced in size so that plural pages may be displayed in one screen at a time (display of a list of thumbnails).

Figure 2:
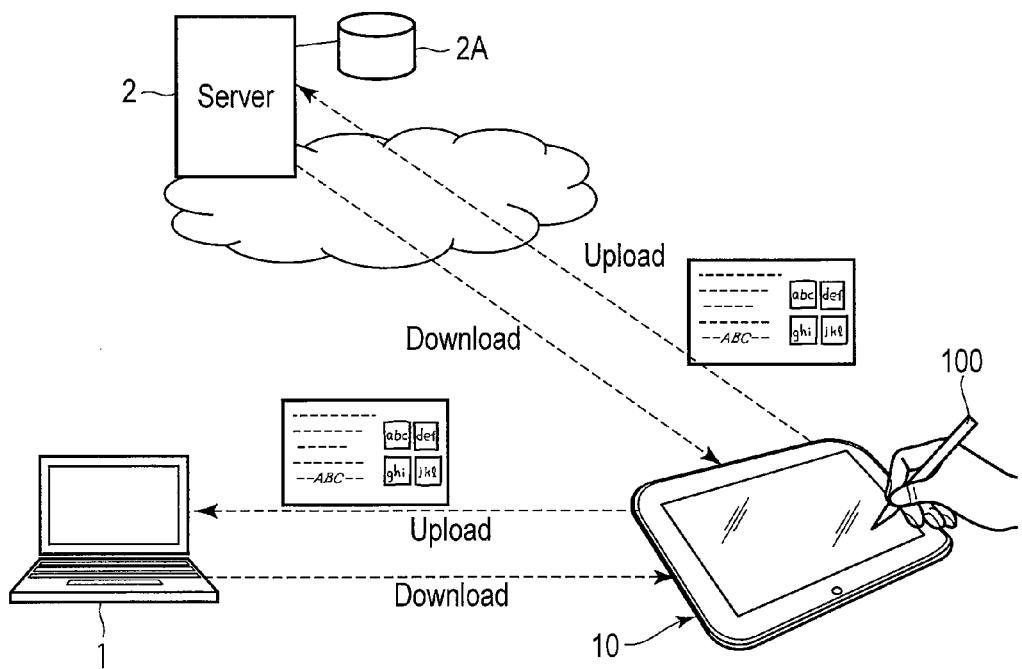
FIG. 2 is an exemplary view illustrating a cooperative operation between the electronic device in the embodiment and an external apparatus.

FIG. 2 shows an example of a cooperative operation between the tablet computer 10 and an external apparatus. The tablet computer 10 can cooperate with a personal computer 1 or cloud computing. Specifically, the tablet computer 10 includes a wireless communication device of, e.g. wireless LAN, and can execute wireless communication with the personal computer 1. Further, the tablet computer 10 can communicate with a server 2 on the Internet. The server 2 may be a server which executes an online storage service, and other various cloud computing services.

The personal computer 1 includes a storage device such as a hard disk drive (HDD). The tablet computer 10 can transmit time-series information (handwritten document) to the personal computer 1 over a network, and can store the time-series information (handwritten document) in the HDD of the personal computer 1 ("upload"). In order to ensure a secure communication between the tablet computer 10 and personal computer 1, the personal computer 1 may authenticate the tablet computer 10 at a time of starting the communication. In this case, a dialog for prompting the user to input an ID or a password may be displayed on the screen of the tablet computer 10, or the ID of the tablet computer 10, for example, may be automatically transmitted from tablet computer 10 to the personal computer 1.

Thereby, even when the capacity of the storage in the tablet computer 10 is small, the tablet computer 10 can handle many time-series information items (many handwritten documents) or large-volume time-series information (large-volume handwritten document).

In addition, the tablet computer 10 can read out ("download") one or more arbitrary time-series information items stored in the HDD of the personal computer 1, and can display the locus of each stroke indicated by the read-out time-series information on the screen of the display 17 of the tablet computer 10. In this case, the tablet computer 10 may display on the screen of the display 17 a list of thumbnails which are obtained by reducing in size pages of plural time-series information items (handwritten documents), or may display one page, which is selected from these thumbnails, on the screen of the display 17 in the normal size.

Furthermore, the destination of communication of the tablet computer 10 may be not the personal computer 1, but the server 2 which provides storage services or cloud computing services, as described above. The tablet computer 10 can transmit time-series information (handwritten document) to the server 2 via the network, and can store the time-series information (handwritten document) in a storage device 2A of the server 2 ("upload"). Besides, the tablet computer 10 can read out arbitrary time-series information which is stored in the storage device 2A of the server 2 ("download") and can display the locus of each stroke, which is indicated by this time-series information, on the screen of the display 17 of the tablet computer 10. In addition, in the case where the server 2 provides a service for a character recognition process of a handwritten document, the tablet computer 10 can receive from the server 2 a character recognition result (character code) for the uploaded time-series information (handwritten document). It is assumed that the result of the character recognition process includes data indicative of a relation between a character code obtained by the character recognition process and stroke data corresponding to one character corresponding to this character code.

As has been described above, in the present embodiment, the storage medium in which the time-series information is stored may be the storage device in the tablet computer 10, the storage device in the personal computer 1, or the storage device in the server 2.

Figure 4:
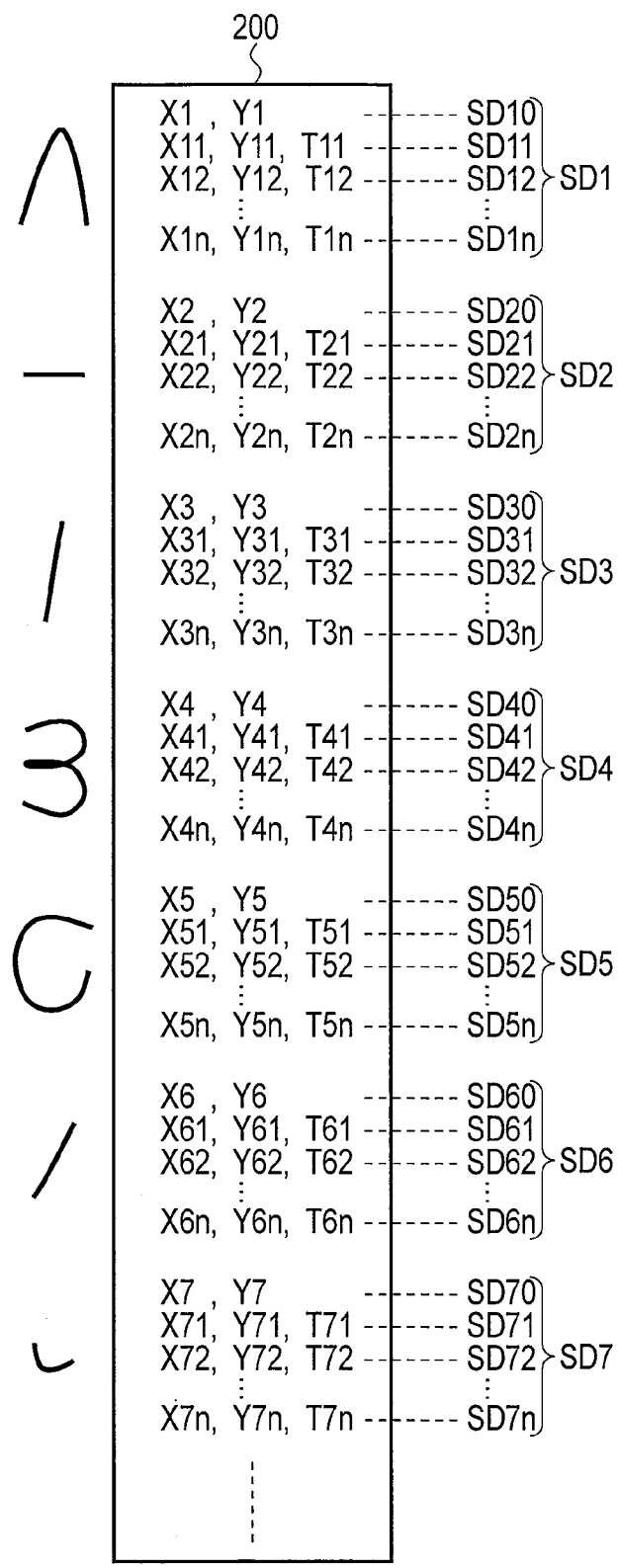
FIG. 4 is an exemplary view for explaining time-series information corresponding to a handwritten document, the time-series information being stored in a storage medium by the electronic device in the embodiment.

Next, referring to FIG. 3 and FIG. 4, a description is given of a relationship between strokes (characters, marks, graphics, tables, etc.), which are handwritten by the user, and time-series information. FIG. 3 shows an example of a handwritten document (handwritten character string) which is handwritten on the touch-screen display 17 by using the pen 100 or the like.

In FIG. 3, the case is assumed that a handwritten character string "ABC" was handwritten in the order of "A", "B" and "C", and thereafter a handwritten arrow was handwritten immediately near the handwritten character "A".

The handwritten character "A" is expressed by two strokes (a locus of "∧" shape, a locus of "−" shape) which are handwritten by using the pen 100 or the like, that is, by two loci. The locus of the pen 100 of the first handwritten "∧" shape is sampled in real time, for example, at regular time intervals, and thereby time-series coordinates SD11, SD12, . . . , SD1$n$ of the stroke of the "∧" shape are obtained. Similarly, the locus of the pen 100 of the next handwritten "−" shape is sampled, and thereby time-series coordinates SD21, SD22, . . . , SD2$n$ of the stroke of the "−" shape are obtained.

The handwritten character "B" is expressed by two strokes which are handwritten by using the pen 100 or the like, that is, by two loci. The handwritten character "C" is expressed by one stroke which is handwritten by using the pen 100 or the like, that is, by one locus. The handwritten "arrow" is expressed by two strokes which are handwritten by using the pen 100 or the like, that is, by two loci.

FIG. 4 illustrates time-series information 200 corresponding to the handwritten document of FIG. 3. The time-series information 200 includes a plurality of stroke data SD1, SD2, . . . , SD7. In the time-series information 200, the stroke data SD1, SD2, . . . , SD7 are arranged in time series in the order of strokes, that is, in the order in which plural strokes are handwritten.

In the time-series information 200, the first two stroke data SD1 and SD2 are indicative of two strokes of the handwritten character "A". The third and fourth stroke data SD3 and SD4 are indicative of two strokes which constitute the handwritten character "B". The fifth stroke data SD5 is indicative of one stroke which constitutes the handwritten character "C". The sixth and seventh stroke data SD6 and SD7 are indicative of two strokes which constitute the handwritten "arrow".

Each stroke data includes coordinate data (hereinafter referred to as "absolute coordinate data") indicative of the position (absolute position) of a stroke in a coordinate detection area, and a plurality of coordinate data corresponding to a plurality of points on the locus of the stroke. It is assumed that the absolute coordinate data is, for example, first detected coordinate data of the stroke (locus). It is assumed that the plurality of coordinate data are indicative of relative positions with reference to the position indicated by the absolute position data.

In each stroke data, the plural coordinate data are arranged in time series in the order in which the stroke is written. For example, as regards handwritten character "A", the stroke data SD1 includes absolute coordinate data SD10 corresponding to the first point of the stroke of the "∧" shape of the handwritten character "A", and an n-number of coordinate data SD11, SD12, . . . , SD1$n$ corresponding to the points on the locus of the stroke of the "∧" shape. The stroke data SD2 includes absolute coordinate data SD20 corresponding to the first point of the stroke of the "−" shape of the handwritten character "A", and an n-number of coordinate data SD21, SD22, . . . , SD2$n$ corresponding to the points on the locus of the "−" shape. Incidentally, the number of coordinate data may differ between respective stroke data.

Each coordinate data is indicative of an X coordinate and a Y coordinate, which correspond to one point representing a locus. For example, the absolute coordinate data SD10 is indicative of an X coordinate (X1) and a Y coordinate (Y1) of the starting point of the stroke of the "∧" shape. The coordinate data SD11 is indicative of an X coordinate (X11) and a Y coordinate (Y11), with the coordinates (X1, Y1) of the starting point of the stroke of the "∧" shape being set as a virtual origin. The coordinate data SD1$n$ is indicative of an X coordinate (X1$n$) and a Y coordinate (Y1$n$) of the end point of the stroke of the "∧" shape, with the coordinates (X1, Y1) being set as the virtual origin.

Further, each coordinate data may include time stamp information T corresponding to a time point at which a point corresponding to this coordinate data was handwritten. The time point at which the point was handwritten may be either an absolute time (e.g. year/month/date/hour/minute/second) or a relative time with reference to a certain time point. For example, an absolute time (e.g. year/month/date/hour/minute/second) at which a stroke began to be handwritten may be added as time stamp information to each stroke data, and furthermore a relative time indicative of a difference from the absolute time may be added as time stamp information T to each coordinate data in the stroke data.

In this manner, by using the time-series information in which the time stamp information T is added to each coordinate data, the temporal relationship between strokes can be more precisely expressed.

Moreover, information (Z) indicative of a pen stroke pressure may be added to each coordinate data.

The time-series information 200 having the structure as described with reference to FIG. 4 can express not only the trace of handwriting of each stroke, but also the temporal relation between strokes. Thus, with the use of the time-series information 200, even if a distal end portion of the handwritten "arrow" is written over the handwritten character "A" or near the handwritten character "A", as shown in FIG. 3, the handwritten character "A" and the distal end portion of the handwritten "arrow" can be treated as different characters or graphics.

In the time-series information 200 of the present embodiment, the arrangement of stroke data SD1, SD2, . . . , SD7 indicates the order of strokes of handwritten characters. For example, the arrangement of stroke data SD1 and SD2 indicates that the stroke of the "∧" shape was first handwritten and then the stroke of the "−" shape was handwritten. Thus, even when the traces of writing of two handwritten characters are similar to each other, if the orders of strokes of the two handwritten characters are different from each other, these two handwritten characters can be distinguished as different characters.

Furthermore, in the present embodiment, a handwritten document is stored not as an image or a result of character recognition, but as the time-series information 200 which is composed of a set of time-series stroke data. Thus, handwritten characters can be handled, without depending on languages of the handwritten characters. Therefore, the structure of the time-series information 200 of the present embodiment can be commonly used in various countries of the world where different languages are used.

Besides, the stroke data SD1, SD2, . . . , include absolute coordinate data indicative of the positions of strokes. Thus, by varying the absolute coordinate data, the position at which the trace of writing of the stroke is displayed can be varied.

Accordingly, when edit, such as insert, delete or move, is executed on an existing handwritten locus on an edit screen for a handwritten document, the display position of the locus of each stroke can be varied on a locus-by-locus basis by varying the absolute coordinate data in accordance with a user operation.

Figure 5:
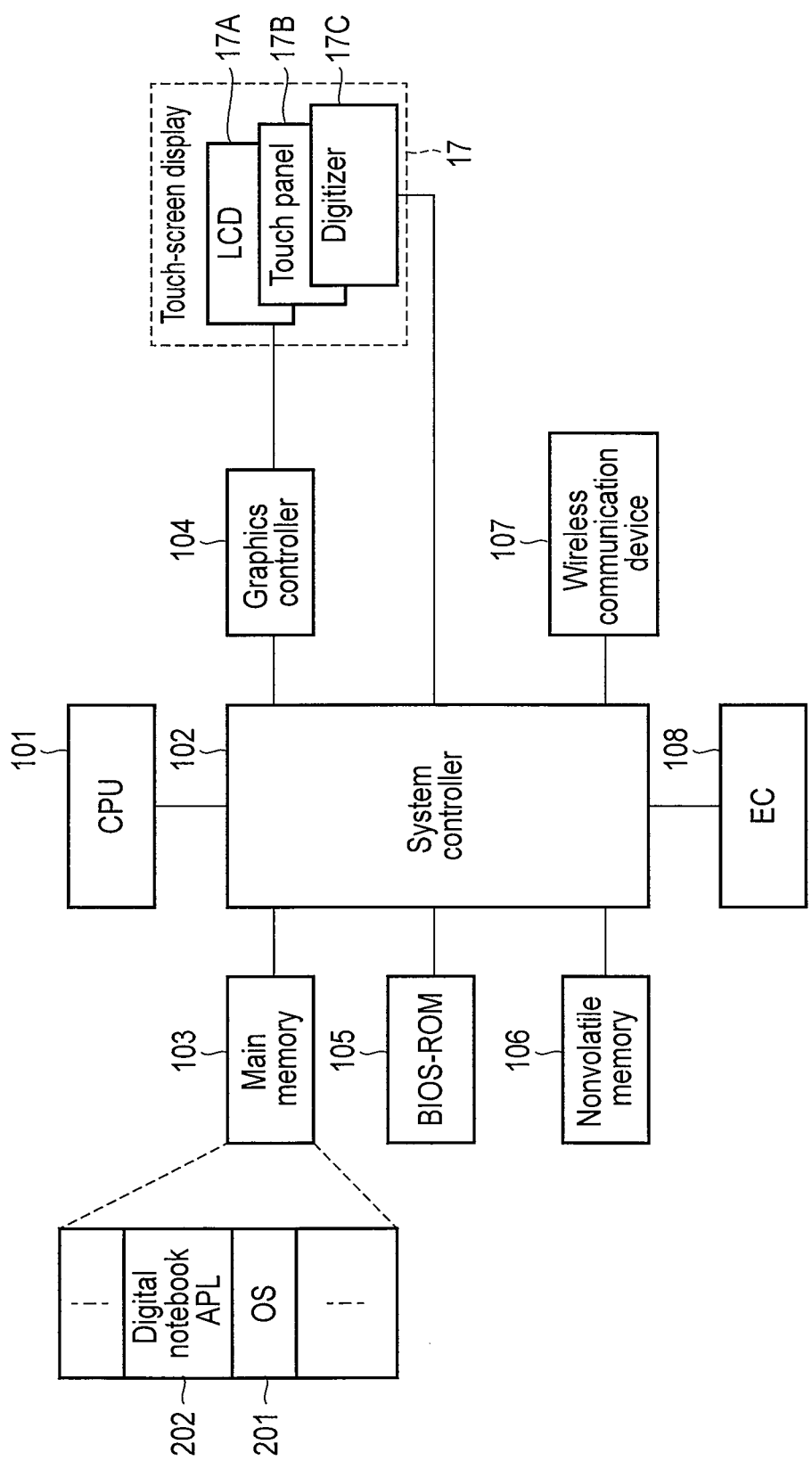
FIG. 5 is an exemplary block diagram illustrating a system configuration of the electronic device in the embodiment.

FIG. 5 shows a system configuration of the tablet computer 10.

As shown in FIG. 5, the tablet computer 10 includes a CPU 101, a system controller 102, a main memory 103, a graphics controller 105, a BIOS-ROM 105, a nonvolatile memory 106, a wireless communication device 107, and an embedded controller (EC) 108.

The CPU 101 is a processor which controls the operations of various modules in the tablet computer 10. The CPU 101 executes various kinds of software, which are loaded from the nonvolatile memory 106 that is a storage device into the main memory 103. The software includes an operating system (OS) 201 and various application programs. The application programs include a digital notebook application program 202. The digital notebook application program 202 includes a function of creating and displaying the above-described handwritten document, a function of editing the handwritten document, a handwriting retrieve function, and a character/graphic recognition function.

In addition, the CPU 101 executes a basic input/output system (BIOS) which is stored in the BIOS-ROM 105. The BIOS is a program for hardware control.

The system controller 102 is a device which connects a local bus of the CPU 101 and various components. The system controller 102 includes a memory controller which access-controls the main memory 103. In addition, the system controller 102 includes a function of communicating with the graphics controller 104 via, e.g. a PCI EXPRESS serial bus.

The graphics controller 104 is a display controller which controls an LCD 17A that is used as a display monitor of the tablet computer 10. A display signal, which is generated by the graphics controller 104, is sent to the LCD 17A. The LCD 17A displays a screen image based on the display signal. A touch panel 17B and a digitizer 17C are disposed on the LCD 17A. The touch panel 17B is an electrostatic capacitance-type pointing device for executing an input on the screen of the LCD 17A. A contact position on the screen, which is touched by a finger, and a movement of the contact position, are detected by the touch panel 17B. The digitizer 17C is an electromagnetic induction-type pointing device for executing an input on the screen of the LCD 17A. A contact position on the screen, which is touched by the pen 100, and a movement of the contact position, are detected by the digitizer 17C.

The wireless communication device 107 is a device configured to execute wireless communication such as wireless LAN or 3G mobile communication. The EC 108 is a one-chip microcomputer including an embedded controller for power management. The EC 108 includes a function of powering on or powering off the tablet computer 10 in accordance with an operation of a power button by the user.

Next, referring to FIG. 6, a description is given of a functional configuration of the digital notebook application program 202.

The digital notebook application program 202 includes a pen locus display process module 301, a time-series information generation module 302, an edit process module 303, a page storage process module 304, a page acquisition process module 305, a handwritten document display process module 306, a process-target block select module 307, and a process module 308.

The digital notebook application program 202 executes creation, display and edit of a handwritten document, by using stroke data which is input by using the touch-screen display 17. The touch-screen display 17 is configured to detect the occurrence of events such as "touch", "movement (slide)" and "release". The "touch" is an event indicating that an external object has come in contact with the screen. The "move (slide)" is an event indicating that the position of contact of the external object has been moved while the external object is in contact with the screen. The "release" is an event indicating that the external object has been released from the screen.

The pen locus display process module 301 and time-series information generation module 302 receive an event "touch" or "move (slide)" which is generated by the touch-screen display 17, thereby detecting a handwriting input operation. The "touch" event includes coordinates of a contact position. The "move (slide)" event also includes coordinates of a contact position at a destination of movement. Thus, the pen locus display process module 301 and time-series information generation module 302 can receive coordinate series, which correspond to the locus of movement of the contact position, from the touch-screen display 17.

The pen locus display process module 301 receives coordinate series from the touch-screen display 17 and displays, based on the coordinate series, the locus of each stroke, which is handwritten by a handwriting input operation with use of the pen 100 or the like, on the screen of the LCD 17A in the touch-screen display 17. By the pen locus display process module 301, the locus of the pen 100 during a time in which the pen 100 is in contact with the screen, that is, the locus of each stroke, is drawn on the screen of the LCD 17A.

The time-series information generation module 302 receives the above-described coordinate series which are output from the touch-screen display 17, and generates, based on the coordinate series, the above-described time-series information having the structure as described in detail with reference to FIG. 4. In this case, the time-series information, that is, the coordinates and time stamp information corresponding to the respective points of each stroke, may be temporarily stored in a working memory 401.

Further, the time-series information generation module 302 can execute a block-structuring process, based on the time-series information, and can divide stroke data corresponding to the respective strokes in units of a block. For example, the stroke data is divided in units of a stroke constituting one character (or one symbol, for instance). The time-series information generation module 302 can divide a plurality of strokes, for example, based on a time from the input of the last coordinates of one stroke to the input of the first coordinates of the next stroke, which is determined based on the time stamp information, and the distance between strokes, which is determined from the coordinates of each stroke. In the meantime, the distance between strokes may be set to be a distance between gravity centers of coordinate data strings of strokes or a distance between centers of circumscribed rectangles of strokes.

For example, as regards the handwritten characters "A" and "B" shown in FIG. 3, in usual cases, the time from the input of the stroke data SD1 (first stroke of "A") of the handwritten character "A" to the input of the next stroke data SD2 (second stroke of "A") is relatively short, and the time from the input of the stroke data SD2 (second stroke of "A") to the input of the stroke data SD3 (first stroke of "B") of the next handwritten character "B" is relatively long. The time-series information generation module 302 compares a predetermined time reference value with the time of the stroke data SD2, SD3.

Thereby, when the time of the stroke data SD2, SD3 is longer than the time reference value, the time-series information generation module 302 finds a boundary between the stroke data SD2 and stroke data SD3 as a candidate of division of strokes.

In addition, the time-series information generation module 302 compares a distance between the respective strokes and a preset distance reference value. When the distance between the strokes is longer than the distance reference value, the time-series information generation module 302 finds a boundary between the strokes as a candidate of division of strokes. As regards the handwritten characters "A" and "B" shown in FIG. 3, the distance between the stroke data SD1 of the handwritten character "A" and the next stroke data SD2 (second stroke of "A") is relatively short, and the distance between the stroke data SD2 (second stroke of "A") and the stroke data SD3 (first stroke of "B") of the handwritten character "B" is relatively long. When the distance between the stroke data SD2 and stroke data SD3 is longer than the distance reference value, the time-series information generation module 302 finds a boundary between the stroke data SD2 and stroke data SD3 as a candidate of division of strokes.

Based on the above-described time and distance between the strokes, the time-series information generation module 302 divides plural stroke data in units of a block, and adds block information indicative of each block to the time-series information.

In the meantime, in the block-structuring process, it is possible not only to divide plural strokes based on the positions and distance of the loci of strokes, as described above, but also to discriminate blocks by using the result of a character recognition process. For example, a plurality of strokes, which have correctly been recognized as a character by the character recognition process, can be discriminated as one block, or strokes corresponding to a plurality of characters, which correspond to a specific word, can be discriminated as one block. Furthermore, a specific set (e.g. one line, one column, one paragraph) may be discriminated based on the arrangement of loci in a handwritten document, and the stroke data included in each set may be divided as one block.

The page storage process module 304 stores the generated time-series information as a handwritten document (handwritten page) in a storage medium 402. The storage medium 402, as described above, may be the storage device in the tablet computer 10, the storage device in the personal computer 1, or the storage device in the server 2.

The page acquisition process module 305 reads out from the storage medium 402 arbitrary time-series information which is already stored in the storage medium 402. The read-out time-series information is sent to the handwritten document display process module 306. The handwritten document display process module 306 temporarily stores in the working memory 401 the time-series information which has been read out of the storage medium 402, analyzes the time-series information, and displays, based on the analysis result, the locus of each stroke indicated by the time-series information on the screen as a handwritten page. In addition, the handwritten document display process module 306 can display on the screen not only a handwritten page for one page on the screen, but also handwritten page thumbnails for a plurality of pages, which are obtained by reducing handwritten pages. In accordance with a retrieval result by a retrieve process module 309 of the process module 308, the handwritten document display process module 306 can select, from a plurality of retrieval-target handwritten pages, handwritten pages including a specific time-series information part which is designated as a retrieve key, and can display a list of the selected handwritten pages by handwritten page thumbnails.

The edit process module 303 executes a process for editing a handwritten page which is currently being displayed. For example, in accordance with an edit operation which is executed by the user on the touch-screen display 17, the edit process module 303 executes an edit process for inserting a new locus in a plurality of strokes which are being displayed, deleting an existing locus, or moving an existing locus. Further, the edit process module 303 updates the time-series information in order to reflect the result of the edit process on the time-series information which is being displayed.

The edit process module 303 includes an insert process module 303a which executes an insert process for inserting a new locus in the loci which are being displayed, in accordance with a user operation, and a delete process module 303b which deletes a locus which is being displayed, in accordance with a user operation. The insert process module 303a and delete process module 303b alter, in accordance with a predetermined edit operation by the user, the time-series information (stroke data) which is temporarily stored in the working memory 401 by the handwritten document display process module 306.

The process module 308 can execute various processes, for example, a handwriting retrieve process and a recognition process, on the process-target time-series information. The process module 308 includes a retrieve process module 309 and a recognition process module 310.

The retrieve process module 309 retrieves, from a plurality of time-series information items (a plurality of handwritten pages) which are already stored in the storage medium 402, a time-series information part corresponding to a specific time-series information part (e.g. a specific handwritten character string) which is a retrieve key. The retrieve process module 309 retrieves, from the plural time-series information items, a time-series information part having the locus of a stroke, the degree of similarity of which to the locus of a stroke corresponding to the specific time-series information part is a reference value or more.

The recognition process module 310 executes a recognition process, such as handwritten character recognition, on the time-series information (handwritten page) that is being displayed. The recognition process module 310 character-recognizes each of a plurality of blocks (handwriting blocks) which are obtained by executing a grouping process for grouping a plurality of stroke data indicated by time-series information that is a recognition process target, and converts each of handwritten characters in the plural blocks to a character code.

Figure 7:
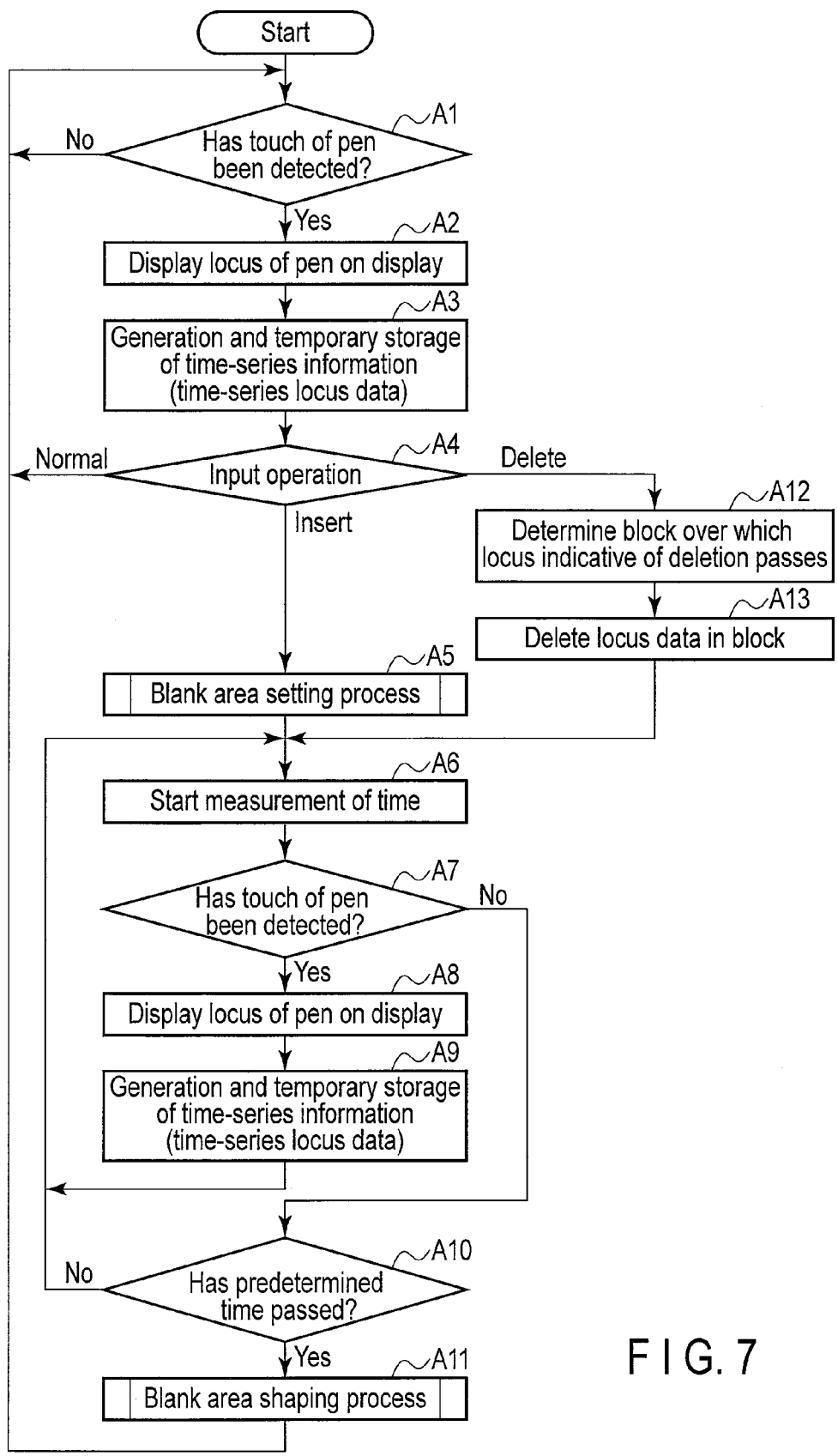
FIG. 7 is an exemplary flowchart illustrating the procedure of a handwritten page creation process in the embodiment.
Figure 8:
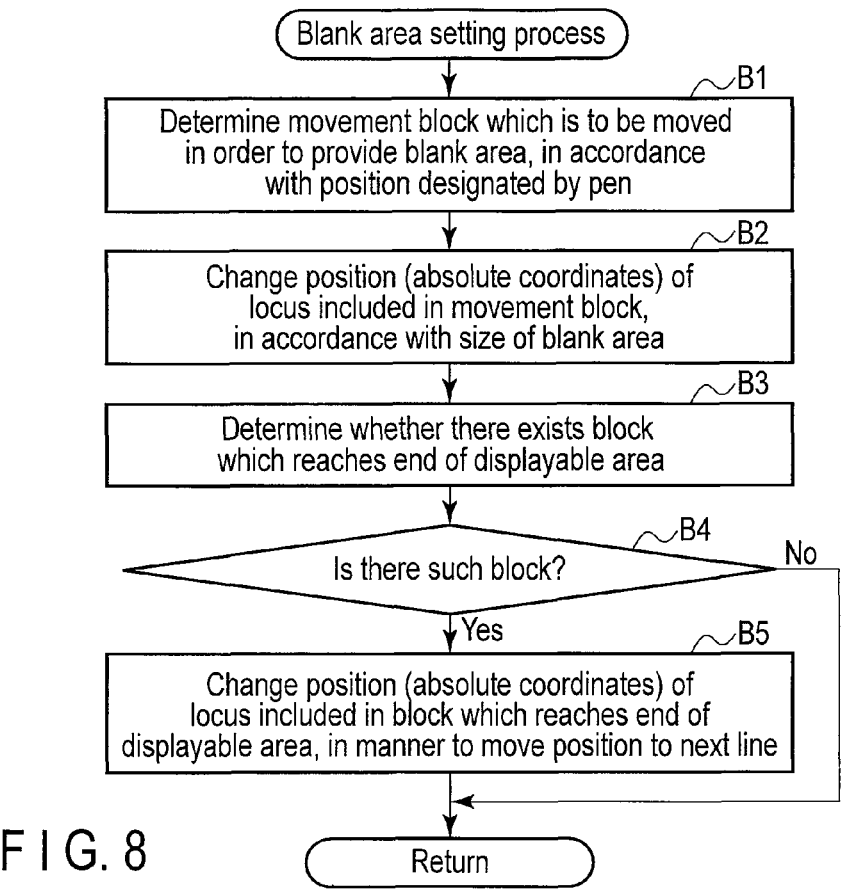
FIG. 8 is an exemplary flowchart illustrating the procedure of a blank area setting process in the handwritten page creation process in the embodiment.
Figure 9:
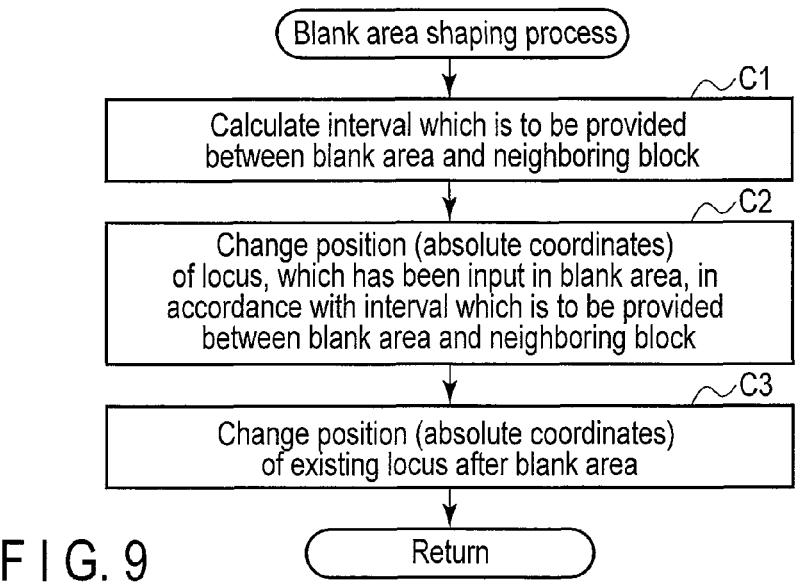
FIG. 9 is an exemplary flowchart illustrating the procedure of a blank area shaping process in the handwritten page creation process in the embodiment.

Next, referring to flowcharts, a description is given of the procedure of a handwritten page creation process which is executed by the digital notebook application program 202. FIG. 7 is an exemplary flowchart illustrating the procedure of the handwritten page creation process in the embodiment. FIG. 8 is an exemplary flowchart illustrating the procedure of a blank area setting process in the handwritten page creation process. FIG. 9 is an exemplary flowchart illustrating the procedure of a blank area shaping process in the handwritten page creation process.

If the user executes a handwriting input operation by using the pen 100, an event of "touch" or "move" occurs. If "touch" by the pen 100 is detected and "move" of the pen 100 is detected (Yes in block A1), the digital notebook application program 202 displays the detected locus of the movement of the pen 100 on the display (block A2). Further, the digital notebook application program 202 generates time-series information (stroke data), based on the coordinate series corresponding to the detected locus of movement of the pen 100, and temporarily stores the time-series information in the working memory 401 (block A3).

When a normal handwriting input operation has been executed by the user, the digital notebook application program 202 displays the locus of a character or the like, which has been handwritten on the touch-screen display 17 (blocks A1 to A4).

In the tablet computer 10 of the present embodiment, a predetermined input operation is executed on a handwritten document which is created by a normal handwriting input operation, whereby a transition occurs to an edit process which can edit the locus.

To begin with, a description is given of an insert process for inserting a character string, etc. into an existing handwritten document (loci). In the case of causing the digital notebook application program 202 to transition to the insert process, the user presses the pen 100 for a long time, for example, at a location of insertion of a character in the displayed handwritten document.

Figure 10A:
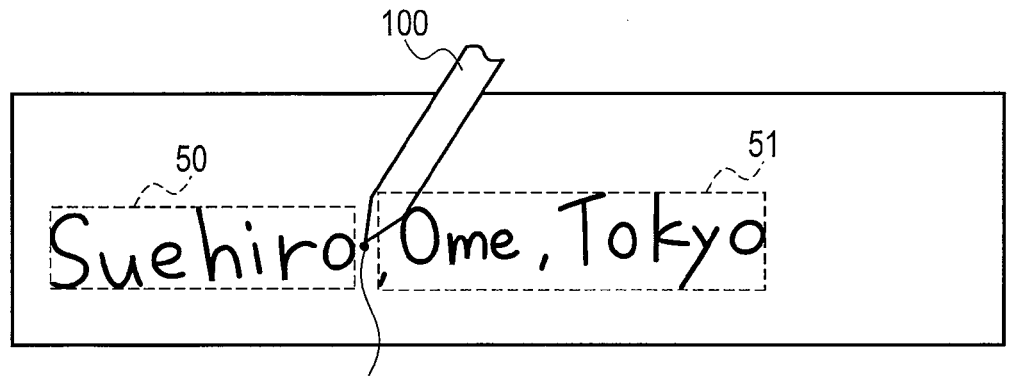
FIG. 10A, FIG. 10B and FIG. 10C are exemplary view illustrating a part of a handwritten document displayed on an edit screen in the embodiment.
Figure 10B:
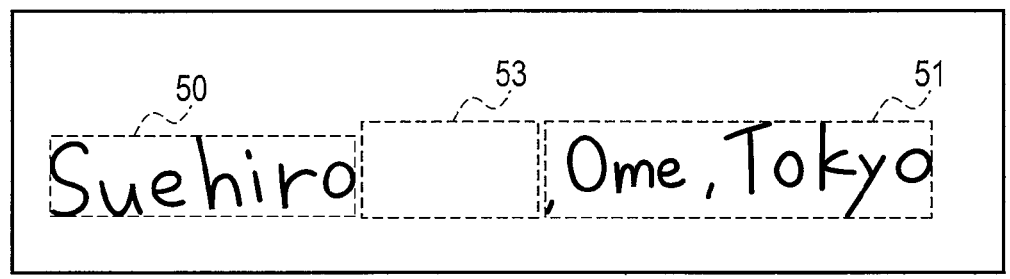
Figure 10C:
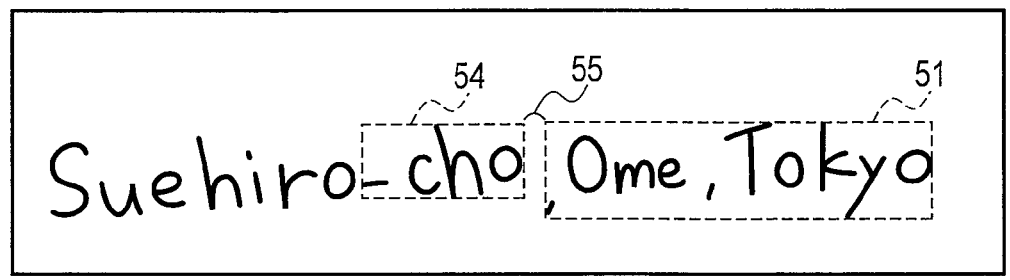

FIG. 10A, FIG. 10B and FIG. 10C show a part of a handwritten document which is displayed on an edit screen. In the description below, a description is given of, by way of example, a handwritten document in which a character string or the like is horizontally written.

In the handwritten document shown in FIG. 10A, the loci of an already input character string "Suchiro, Ome, Tokyo" are displayed. It is assumed that the time-series information of this character string has been subjected to a block-structuring process, and stroke data are divided in units of a block.

When the pen 100 has been pressed for a long time, that is, when it has been detected that the contact position of the pen 100 remains unmoved for a predetermined time or more (block A4, "Insert"), the insert process module 303a starts a blank area setting process (block A5). In the blank area setting process, a blank area is set so that a character or the like can be inserted among existing loci by a new handwriting input operation.

FIG. 8 is a flowchart illustrating the procedure of the blank area setting process.

To start with, the insert process module 303a determines a movement block which is to be moved in order to provide a blank area, in accordance with the position designated by the pen 100 and the arrangement of existing loci (block B1). The insert process module 303a sets a circumscribed rectangular frame, for example, in units of a block, based on coordinate data indicated by stroke data. The insert process module 303a determines between which circumscribed rectangular frames of blocks the touch position by the pen 100 is included. In this case, the target is a handwritten document in which a character string or the like is horizontally written. Specifically, since the loci are arranged in the horizontal direction (X coordinate direction), the insert process module 303a can determine which line of blocks (character strings) is designated, based on Y coordinate data of the loci indicated by stroke data, and can determine between which blocks a touch position 52 by the pen 100 is included.

In the example of FIG. 10A, the touch position 52 by the pen 100 is included between a block corresponding to character "o" and a block corresponding to ",". The insert process module 303a does not determine that a block 50 including the block corresponding to character "o" is a movement block, but determines that a block 51 including the block ",", which is present after the touch position 52, is a movement block. Incidentally, when a handwritten document which is horizontally written is a target, a block which is present after the touch position 52 is a block corresponding to stroke data having a greater X coordinate value than the touch position 52. It is assumed that the insert process module 303a changes the direction of determination of a movement block, in accordance with the arrangement of loci of a handwritten document.

The insert process module 303a varies, in accordance with the size of the blank area, the position (absolute coordinates) of the stroke data of each locus included in the movement block. The size of the blank area is preset and is, for instance, such a size that a plurality of characters can be handwritten. The insert process module 303a adds the size of the blank area to the X coordinate of the absolute coordinate data of the stroke data of each locus included in the movement block, and thereby can move the display position of the movement block to the right.

FIG. 10B illustrates an example of a handwritten document in which a blank area 53 is provided. As shown in FIG. 10B, the display positions of the stroke data of all loci included in the block 51, which is present after the touch position 52, are moved to the right. Thereby, the blank area 53 is provided between the block 50 and the block 51.

In this case, the insert process module 303a determines whether there exists a block which reaches an end of a displayable area, by changing the display positions of the loci in the block in order to provide the blank area. For example, in the case of the horizontal handwritten document, it is determined that there exists a block reaching the end of the displayable area, when a block at the end of the line cannot be displayed in the displayable area if the display position of the block is changed.

If the block reaching the end of the displayable area exists (Yes in block B3), the insert process module 303a changes the position (absolute coordinates) of the stroke data included in the block reaching the end of the displayable area, so that this position (absolute coordinates) shifts to the next line, and thus the loci in the block are displayed in the next line (block B5). A display example in which the loci in the block are displayed in the next line will be described later (see FIG. 14A and FIG. 14B).

If the blank area is provided by the blank area setting process, the insert process module 303a starts measuring a time for determining the end of a handwriting input in the blank area (block A6).

If a character string or the like is input by handwriting in the blank area 53 by using the pen 100, the digital notebook application program 202 detects "touch" and "move" by the pen 100 (Yes in block A7), displays the detected locus of movement of the pen 100 on the display (block A8), and generates time-series information (stroke data) corresponding to the locus and temporarily stores the time-series information in the working memory 401 (block A9).

Specifically, the user can input a character string or the like in the blank area 53 by a normal handwriting input operation and can display the locus (blocks A7 to A9). After the end of the handwriting input operation in the blank area 53, the insert process module 303a starts measuring a time. Then, if no handwriting input operation is executed (No in block A7) and a predetermined fixed time has passed (Yes in block A10), the insert process module 303a executes a blank area shaping process for deleting an unnecessary blank portion of the blank area 53 and shaping the arrangement of loci (block A11).

In this case, if the fixed time has passed since the end of the input operation in the blank area 53, the blank area shaping process is started. Alternatively, the blank area shaping process may be started in accordance with a predetermined input operation by the user. For example, a button for instructing the end is provided, and if an input operation on this button has been executed, the end of the handwriting input in the blank area 53 is determined and the blank area shaping process is started.

As has been described above, in the blank area setting process, a blank area of a predetermined size is set. Thus, when a character string or the like, which is handwritten in the blank area 53, is small, an excess blank remains in the arrangement of loci. In the blank area shaping process, the display position of the loci in the block after the blank area 53 is varied so as to leave only a necessary blank.

FIG. 9 is a flowchart illustrating the procedure of the blank area shaping process.

To start with, the insert process module 303*a* finds an interval between the blank area 53 and a neighboring block, that is, a space which is to be secured after the character string or the like which is inserted in the blank area 53 (block C1). The insert process module 303*a* may determine, for example, the interval, which is to be provided between the blank area 53 and the neighboring block, to be a mean value between blocks which is found by setting as targets character-unit blocks in the vicinity of the blank area 53, or to be an interval between blocks neighboring the touch position 52 (an interval before setting the blank area 53).

Next, the insert process module 303*a* changes the position (absolute coordinates) of the locus that has been input in the blank area 53, in accordance with the interval provided between the blank area 53 and the neighboring block. Specifically, with respect to the stroke data of the locus that is closest to the block 50 among the loci which have been input by handwriting in the blank area 53, the insert process module 303*a* changes the absolute coordinate data (X coordinate) to agree with the interval calculated in block C1. Similarly, with respect to all the other loci which have been input by handwriting in the blank area 53, the insert process module 303*a* changes the absolute coordinate data (X coordinate) of each stroke data in accordance with the coordinate value by which the stroke data of the closest locus has been varied.

However, when the distance between the locus, which has been input by handwriting in the blank area 53, and the block 50 is shorter than the interval calculated in block C1, it is determined that there is no excess blank, and the position of the locus in the blank area 53 is not changed.

Next, the insert process module 303*a* varies the position (absolute coordinates) of the existing locus which is present after the blank area 53 (block C3). Specifically, with respect to the stroke data of the locus in the block 51, which is closest to the locus added in the blank area 53 (the locus after the change of the position), the insert process module 303*a* changes the absolute coordinate data (X coordinate) so that the distance from the locus of the blank area 53 may become equal to the interval calculated in block C1. Similarly, with respect to all the other loci in the block 51, the insert process module 303*a* changes the absolute coordinate data (X coordinate) of each stroke data in accordance with the coordinate value by which the stroke data of the closest locus has been varied.

FIG. 10O show an example of a handwritten document after the execution of the blank area shaping process. In the example shown in FIG. 10O, a character string "-cho" is input by handwriting in the blank area 53. A block 54 is set for the character string "-cho". Since the character string "-cho" added in the blank area 53 is input by handwriting in the vicinity of the block 50 which exists in front, the position of the loci is unchanged. The position of the locus "," included in the block 51, which is closest to the block 54, has been changed to a position at which an interval 55 calculated in block C1 is provided from the locus added in the blank area 53. As regards the other loci included in the block 51, the positions have been changed by the same amount as the locus ",". In this manner, in the blank area setting process, after the handwriting input in the blank area 53, the unnecessary blank portion is deleted, and the arrangement between the locus, which has been input in the blank area 53, and the loci existing before and after this locus, can be shaped.

As has been described above, in the insert process, the location, at which a character or the like is to be newly inserted among the existing loci disposed in the handwritten document, is designated by pressing the pen 100 for a long time. Thereby, the blank area 53 is provided. If a character or the like is input by handwriting in the blank area 53, an excess blank portion is deleted, and the arrangement of loci is set in order. Thus, even in the case of a document which is created by handwriting, a character string or the like can be inserted afterward by a simple input operation.

In the above description, the location for insertion is pressed by the pen 100 for a long time when the blank area 53 is to be set. Alternatively, the blank area 53 may be set by other input operations. Next, another method of setting the blank area will be described.

FIG. 11A, FIG. 11B, FIG. 11C and FIG. 11D illustrate an example in which a blank area is set in a range corresponding to a user operation.

Figure 11A:
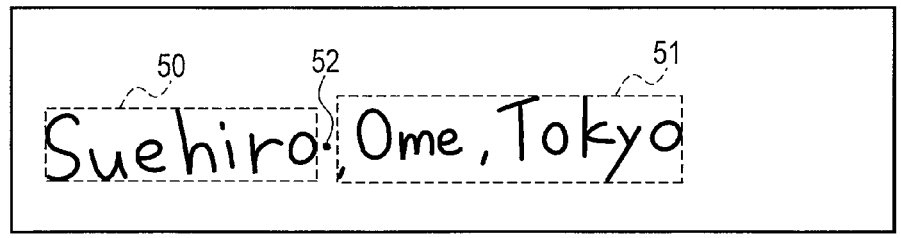
FIG. 11A, FIG. 11B, FIG. 11C and FIG. 11D are view illustrating an example in which a blank area is set in a range according to a user operation in the embodiment.
Figure 11B:
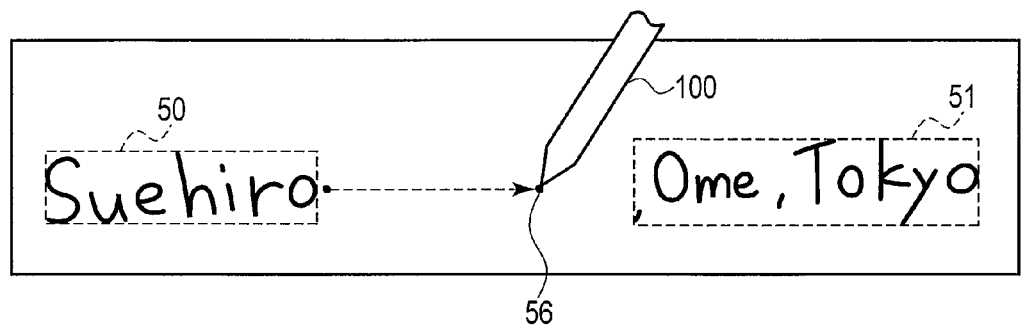

As shown in FIG. 11A, it is assumed that the pen 100 has been pressed for a long time between the block 50 and block 51 (the same as in FIG. 10A). In this case, as described above, the blank area 53 is provided in accordance with the touch position 52 designated by the pen 100. As shown in FIG. 11B, when the pen 100 is moved while the pen 100 is in the touched state, the insert process module 303*a* enlarges the blank area in accordance with the movement of a touch position 56.

Accordingly, when the user is to insert a long character string or the like, the user can set a necessary blank area by a simple operation. Therefore, even in the case where a long character string or the like is to be inserted, there is no need to repeatedly execute the insert process.

Figure 11C:
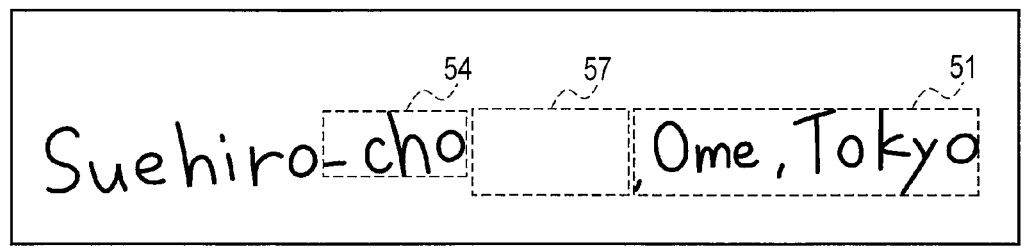
Figure 11D:
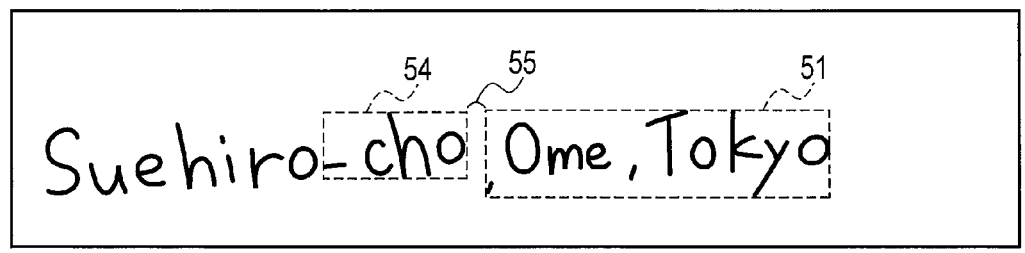

FIG. 11C illustrates an example in which the locus of character string "-cho", which has been handwritten in the blank area, is displayed. In the example shown in FIG. 11C, since the inserted character string "-cho" is short, an unnecessary blank 57 remains in the blank area. However, by the above-described blank area shaping process, as shown in FIG. 11D, the unnecessary portion of the blank area is deleted, with a proper interval 55 provided between the block 54 of the inserted loci and the following block 51. Therefore, after the end of the insert process, a handwritten document, in which the arrangement of the existing loci and the loci inserted in the blank area has been set in order, can be obtained.

FIG. 12 is a view illustrating an example in which a blank area is set by inputting a predetermined pattern by handwriting.

FIG. 12 shows an example in which a "V" shape is set as the predetermined pattern which is preset in order to instruct setting of a blank area. The recognition process module 310 executes a recognition process for a locus which has been input by handwriting, thereby determining whether the locus is a locus indicative of the predetermined pattern. If the recognition process module 310 determines that the predetermined pattern has been input by handwriting, the insert process module 303*a* sets a blank area in accordance with the position of the locus of this pattern, in the same manner as described above. For example, the blank area is set by using the position of the lower-end apex of the "V"-shaped pattern, like the touch position 52 shown in FIG. 10A. Incidentally, aside from the "V"-shaped pattern, other patterns, which can specify the position at which the blank area is to be set, may be used.

FIG. 13A, FIG. 13B and FIG. 13C illustrate an example in which a menu is displayed in response to long-time pressing by the pen 100.

As shown in FIG. 13A, if the pen 100 is pressed for a long time, the edit process module 303 displays a menu in accordance with the touch position 52. For example, as shown in FIG. 13B, the edit process module 303 displays a menu in accordance with the touch position 52 (or in a manner to include the touch position 52). A menu 61 shown in FIG. 13B includes an "Insert" item 61a for instructing execution of an insert process, and a "Delete" item 61b for instructing execution of a delete process.

After the menu 61 was displayed, if the "Insert" item 61a is selected by the pen 100, as shown in FIG. 13C, the insert process module 303a sets a blank area, as described above, for example, in accordance with the touch position 52 that was first pressed for a long time by the pen 100. In the meantime, after the "Insert" item 61a was selected by the pen 100, a blank area may be set in accordance with a position which is subsequently touched by the pen 100.

Next, a description is given of a display example in which there exists a block which reaches an end of a displayable area due to the setting of a blank area in the blank area setting process (FIG. 8).

Figure 14A:
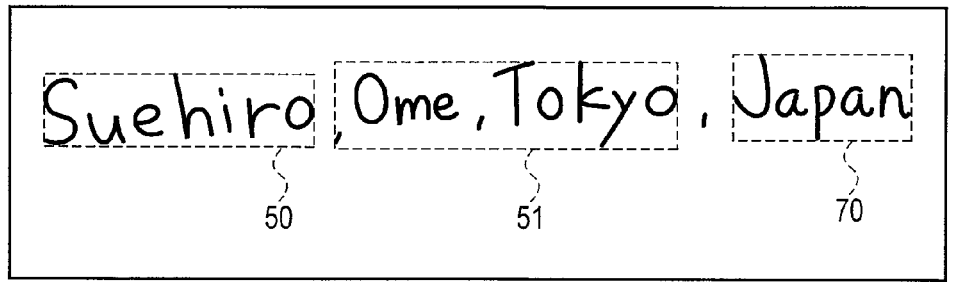
FIG. 14A and FIG. 14B are view illustrating an example in which the display position of a block is changed in accordance with setting of a blank area in the embodiment.

In an example shown in FIG. 14A, a block 70 of a character string "Japan" is present near an end of a displayable area in which the loci in a handwritten document can be displayed. Like FIG. 10A, it is assumed that a blank area has been set between the block 50 and block 51. In this case, the block 70 cannot be displayed within the displayable area. In this case, the insert process module 303a changes the values of stroke data of all loci included in the block 70 to values corresponding to the next line. Thereby, the block 70 is moved to the next line. Then, a character string "-cho" is inserted in the blank area. After an excess blank is deleted by the blank area shaping process, if the block 70 cannot be displayed in the original line in the displayable area, the block 70 is left in the next line to which the block 70 has been moved.

In the meantime, the values corresponding to the next line may be determined in advance, or may be determined by calculating the distance between lines, based on the arrangement of other lines (blocks).

Figure 14B:
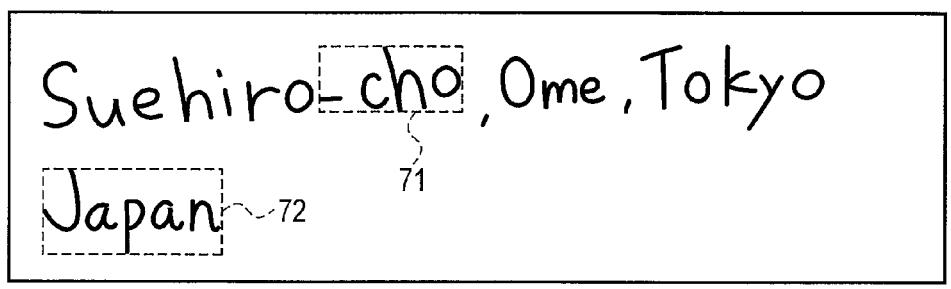

FIG. 14B illustrates an example in which the block 72 of character string "Japan" at the end of the line has been shifted to the next line, due to the addition of the block 71 of character string "-cho" in the blank area.

In the meantime, FIG. 14B illustrates an example in which a block is set in units of a word, and the block corresponding to a word is shifted to the next line. Alternatively, when a block is set in units of a character, for example, a block of a character unit, which reaches the end of the displayable area, may be moved to the next line.

As has been described above, even in the case where the locus at the end of a line cannot be displayed in the displayable area due to the insertion of a new character string or the like in the existing handwritten document, the display position of the locus which cannot be displayed in the same line is shifted to the next line. Therefore, the shape of existing loci is not disordered.

In the above description, when the blank area is set in the handwritten document, an input operation by the pen 100 is executed. Alternatively, the blank area may be set by the user touching the touch-screen display 17 by a finger. For example, the user touches loci, which are displayed, by two fingers, and moves the touch positions in such a manner that the distance between the two fingers, which are in touch with the touch-screen display 17, will increase. The insert process module 303a varies the display positions of the loci (or blocks) at the positions of the first touch in accordance with the movement of the touch positions, thereby setting a blank area between the positions designated by the two fingers.

Next, a modification of the insert process is described.

In the above description, it is presupposed that when a handwritten document is created, loci which are continuous over a plurality of lines can be input by handwriting. A description is now given of an insert process in a case where an area in which a handwriting input can be executed is limited, for example, in units of a line.

Figure 15A:
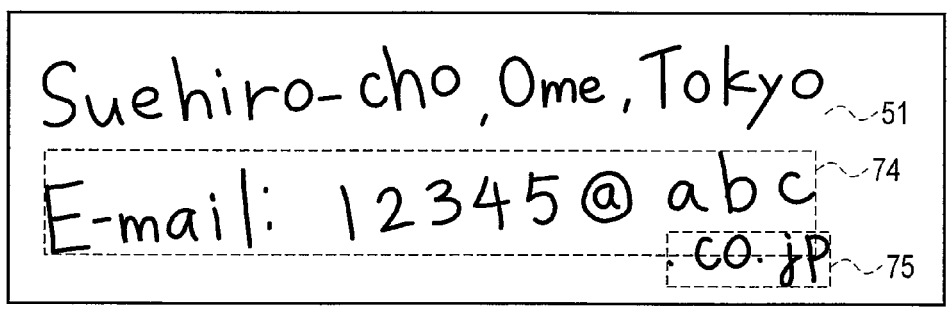
FIG. 15A and FIG. 15B are exemplary view illustrating a modification of an insert process in the embodiment.

For example, it is assumed that an address input area, an e-mail address input area, a telephone number input area, etc. are preset in units of a line. In FIG. 15A, in the address input area of the first line, a character string "Suchiro-cho, Ome, Tokyo", which is indicative of an address, is input by handwriting. In the e-mail address input area of the second line, a character string "E-mail: 12345@abc", which is indicative of an e-mail address, is input by handwriting, but this character string reaches the end of the line, and a remaining character string ".co.jp" is input by handwriting in the vicinity of the end of the next line.

In this case, the insert process module 303a determines that the character string ".co.jp", which is input by handwriting in the vicinity of the end of the next line, is a locus which is to be inserted in the e-mail address input area of the preceding line. The insert process module 303a reduces, with the same magnification, the display size of the loci (block 74) of a character string which was previously input by handwriting, and the display size of the loci (block 75) of a character string which was input by handwriting in the next line, so that the loci of the character string ".co.jp" can be inserted at the end of the line of the e-mail address input area.

Figure 15B:
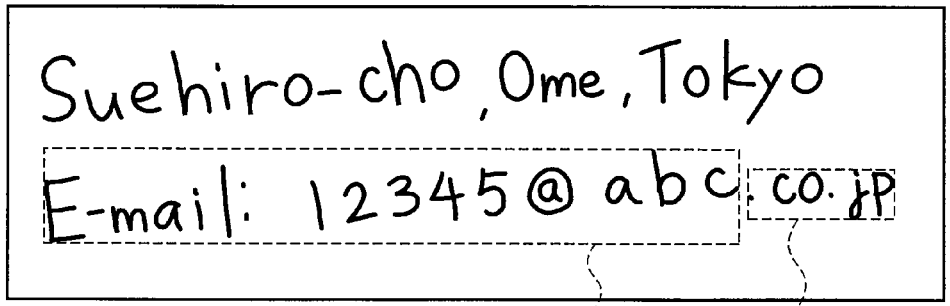

Subsequently, the edit process module 303 sets in order the display positions of loci, so that the loci of the two reduced blocks may fall within one line. As shown in FIG. 15B, the position of a block 76, which is formed by reducing the size of the block 74, is changed to a position corresponding to the beginning of the line, and the position of a block 77, which is formed by reducing the size of the block 75, is changed to the same line position as the block 76. Specifically, with respect to all stroke data of the loci, the insert process module 303a varies the absolute positions and the coordinate data indicative of the loci in accordance with the reduction in size and the change of display positions.

In the above-described example, the character string, which has been input by handwriting in the vicinity of the end of the next line, is inserted at the end of the preceding line. However, any character string, other than a character string which is input by handwriting at the beginning of the next line, may be inserted at the end of the preceding line in the same manner as described above. A character string, which has been input at the beginning of the next line, is determined to be, for instance, a character string which has been input in the telephone number input area of the third line.

In the example shown in FIG. 15A and FIG. 15B, the description has been given of the example in which a handwritten character string or the like is added at the end of the line. However, a character string or the like may be inserted by setting a blank area between loci, as described above. In this case, the display sizes of blocks including all loci are reduced, and all the loci that are input by handwriting are displayed such that these loci fall within one line.

Next, a description is given of the case in which a blank area is set between lines.

In the above description, the blank area is provided in the horizontal direction in accordance with a position designated between loci (or blocks). Alternatively, the blank area may be provided in the vertical direction (between lines) in accordance with a position designated between lines.

FIG. 16A illustrates an example of a handwritten document in which character strings in two lines are input by handwriting. In the example shown in FIG. 16A, it is assumed that blocks 80 and 81 are set for the character strings of the respective lines. It is also assumed that a position between the block 80 and block 81 has been designated by long-time pressing by the pen 100 as a position at which a blank area is to be set. Specifically, a position between loci, which are arranged in the vertical direction, is designated as a position at which a blank area is to be set. In the meantime, other setting and designating methods for the blank area, as described above, may also be used. In accordance with the designation, the insert process module 303a sets a blank area 82 between the block 80 and block 81, as shown in FIG. 16B. The user can input a new character string or the like by handwriting in the blank area 82.

Figure 17A:
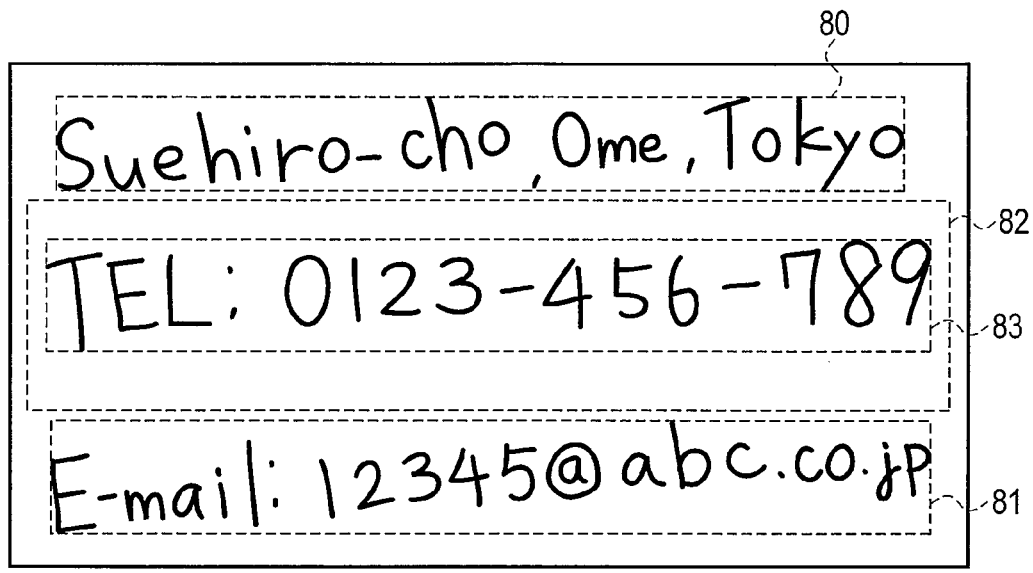
FIG. 17A and FIG. 17B are view illustrating an example in which a blank area is provided in the vertical direction (between lines) in the embodiment.
Figure 17B:
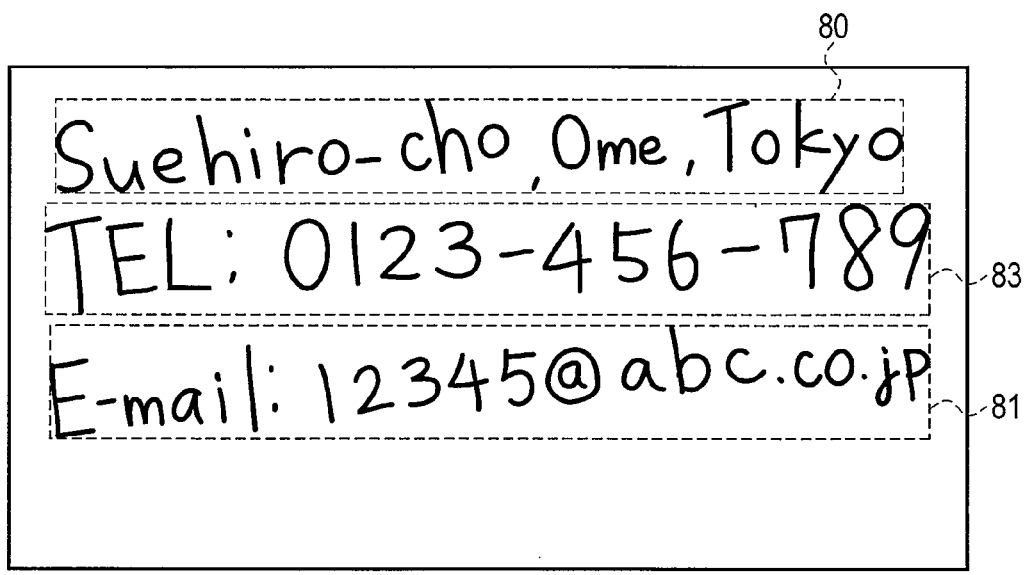

FIG. 17A illustrates an example in which a character string is input by handwriting in the blank area 82. A block 83 is set for the character string (loci) which has been input by handwriting in the blank area 82. In the blank area shaping process, the insert process module 303a changes the positions (absolute coordinates) of all the loci included in the block 83 and block 81, so that proper blank areas are provided between the block 83 and the blocks 80 and 81, and the other unnecessary blank portion is deleted. As a result, as shown in FIG. 17B, a handwritten document, in which proper intervals are provided between the blocks (lines), is created.

In this manner, when a horizontal handwritten document is created, a blank area can be provided between lines, and a character string or the like can be inserted by handwriting in this blank area.

Next, a description is given of a delete process for deleting a character string or the like from an existing handwritten document (loci).

When the user deletes a character string or the like from a handwritten document (loci), the user executes, for example, a predetermined input operation indicating deletion of loci by using the pen 100, on the loci in the handwritten document which is displayed.

When the predetermined input operation indicating deletion of loci has been executed by using the pen 100 (block A4, "Delete"), the delete process module 303b executes a delete process of deleting an existing locus in accordance with a locus which has been input by the input operation.

Figure 18A:
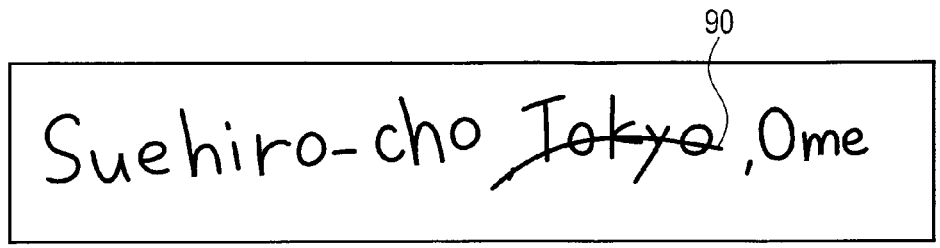
FIG. 18A, FIG. 18B and FIG. 18C are exemplary view for explaining a delete process in the embodiment.

FIG. 18A illustrates a display example in a case where a predetermined input operation indicating deletion has been executed on the loci in a handwritten document. In the example shown in FIG. 18A, a continuous line passing over a block, which is set for loci that are a target of deletion, has been input by handwriting, and a locus 90 of this line is displayed. In the example shown in FIG. 18A, it is assumed that a block is set in units of a character.

Figure 19:
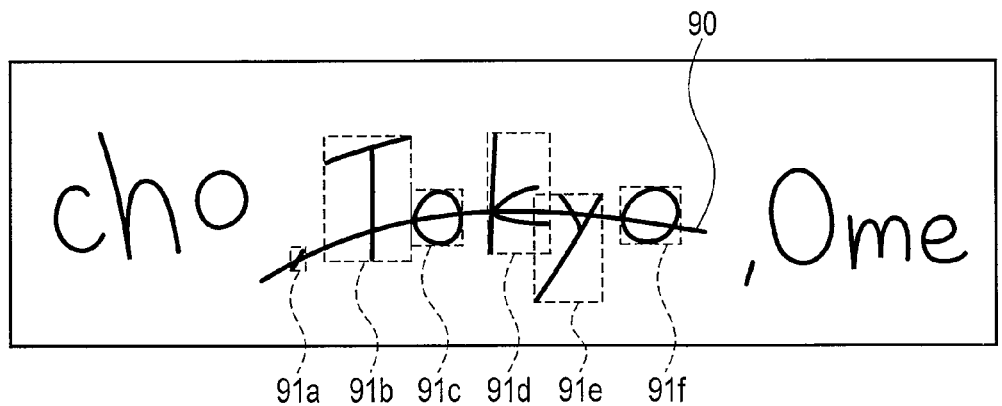
FIG. 19 is an exemplary view for explaining the delete process in the embodiment.

To start with, the delete process module 303b determines blocks over which the locus 90 indicative of deletion of existing loci passes (block A12). FIG. 19 is a view illustrating, in enlarged scale, the vicinity of the locus 90 shown in FIG. 18A. As shown in FIG. 19, the locus 90 passes over blocks 91a, 91b, 91c, 91d, 91e and 91f which are set for existing loci.

Accordingly, the delete process module 303b determines, as targets of deletion, the loci included in the blocks 91a, 91b, 91c, 91d, 91e and 91f.

Figure 18B:
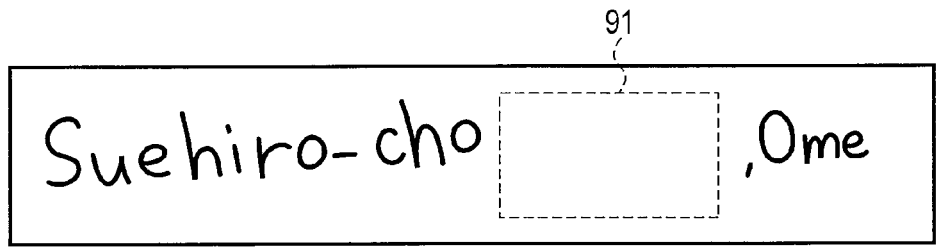

The delete process module 303b deletes all the loci included in the corresponding blocks (block A13). As a result, as shown in FIG. 18B, a blank area 91 is set in the range in which the loci have been deleted. Like the blank area which is set in the insert process, a new character string or the like can be input by handwriting in this blank area 91 within a predetermined time period (blocks A6 to A8).

Figure 18C:
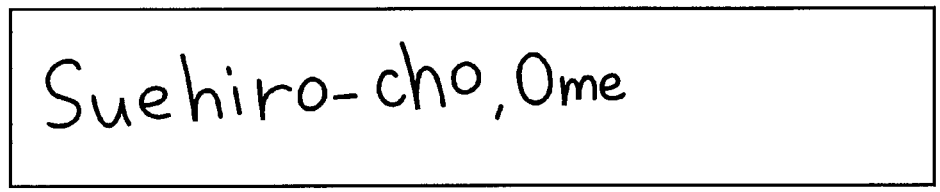

If a predetermined time period has passed without a handwriting input in the blank area 91 (Yes in block A10), the delete process module 303b executes the blank area shaping process, as in the insert process, and deletes the blank area 91 and changes the position of the loci which exist after the blank area 91. As a result, as shown in FIG. 18C, a handwritten document, in which the blank area is deleted and the display positions of the other loci are set in order, is created.

In the above description, the case in which a block is set in units of a character has been described by way of example. For example, in the case where a block is set in units of a word, a predetermined input operation indicating deletion of loci is executed for this block, and thereby loci can be deleted in units of a word. Similarly, deletion may be executed in units of some other block which is set for a locus, a line, etc. Which block unit is to be used for deletion may be determined in advance or may be determined by the switching by a user's input operation.

Besides, in the above description, the input operation indicating deletion is the operation of inputting by handwriting a continuous line passing over blocks which are set for existing loci. Alternatively, other input operations may be used.

FIG. 20A is a view illustrating an example in which a block that is a target of deletion is designated by inputting a predetermined pattern by handwriting.

FIG. 20A shows the example in which a "V" shape is set as the predetermined pattern which is preset for designating a block that is a target of deletion. The recognition process module 310 executes a recognition process for a locus that has been input by handwriting, thereby determining whether the locus is a locus indicative of the predetermined pattern. If the recognition process module 310 determines that the predetermined pattern has been input by handwriting, the delete process module 303b determines a block that is a target of deletion, in accordance with the position of the locus of this pattern. For example, the block including the position of the lower-end apex of the "V"-shaped pattern is determined to be the target of deletion. As a result, in FIG. 20A, a block 93 is determined to be the target of deletion. The delete process module 303b deletes the loci included in the block 93. Thus, as shown in FIG. 20B, a handwritten document, in which the loci of the block 93 have been deleted, is created.

Incidentally, aside from the "V"-shaped pattern, other patterns, which can designate a block that is the target of deletion, may be used.

When the "Delete" item 61b of the menu 61 shown in FIG. 13B has been selected, the delete process module 303b may execute the delete process. After the "Delete" item 61b is selected, the delete process module 303b determines a block that is the target of deletion, in accordance with a locus which is next input by handwriting. By executing the delete process by the menu 61, it can be clearly determined whether the input operation on the touch-screen display 17 is a stroke for creating a handwritten document or a stroke for designating a block (locus) that is to be deleted.

In this manner, by executing a simple input operation indicating deletion, a locus that is designated among existing loci can be deleted.

In the above description, the case, in which a handwritten document in which a character string is written in the horizontal direction is created, has been described by way of example. The same edit process as described above is applicable to the case in which a handwritten document in which a character string is written in the vertical direction is created. Specifically, it is determined that a document by handwriting in the vertical direction is being created, based on the arrangement of loci indicated by stroke data, and then it is determined which locus of a block is to be set as the target of edit, in accordance with a position designated on the handwritten document (loci).

In addition, when edit, such as insert, delete or move, is executed on existing handwritten loci, the edit process module 303 executes a process of delete, move, add, etc. on the stroke data that is the target of the process. In this case, when a plurality of stroke data are selected as a set of stroke data of the process target, the edit process module 303 can delete the plural stroke data from the screen at a time, or move the plural stroke data to another position on the screen at a time. In the time-series information, the time-series coordinates of each moved stroke data may be automatically varied in accordance with the position to which the stroke data has been moved. In addition, an operation history, which indicates that the time-series coordinates of each moved stroke data have been varied, may be added to the time-series information. Each deleted stroke data may not necessarily be deleted from the time-series coordinates, and an operation history, which indicates that the stroke data has been deleted, may be added to the time-series information.

The above-described edit process may be executed by the personal computer 1 or the server 2 on the Internet, which operates in cooperation with the tablet computer 10.

The various processes on the handwritten document in the embodiment can be realized by a computer program. Thus, the same advantageous effects as with the present embodiment can easily be obtained simply by installing the computer program into an ordinary computer including a touch-screen display through a computer-readable storage medium which stores the computer program, and by executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a memory; and
processing circuitry to:
store, in the memory, stroke data corresponding to a plurality of strokes that are handwritten, the plurality of strokes comprising a first stroke and a second stroke;
execute a process of displaying on a screen of a display loci corresponding to the plurality of strokes based on the stroke data, the loci comprising a first locus corresponding to the first stroke and a second locus corresponding to the second stroke;
insert a blank area between the first locus and the second locus on the screen, in accordance with an input operation of designating a position between the first locus and the second locus; and
if at least one stroke is newly handwritten on the blank area after the blank area is inserted:
execute a process of displaying on the blank area loci corresponding to the at least one stroke newly handwritten; and
execute, on the condition that a remaining space within the blank area on which no stroke is newly handwritten is larger than a first space, a process of changing the stroke data to move a display position of at least one of the first locus and the second locus to the remaining space.

2. The electronic device of claim 1, the processing circuitry to execute a process of displaying on the screen the loci, based on the changed stroke data.

3. The electronic device of claim 1, the processing circuitry to set the blank area in a direction corresponding to an arrangement of the first locus and the second locus.

4. The electronic device of claim 1, the processing circuitry to delete a locus designated by another input operation.

5. A handwritten document creation method comprising:
storing, in a memory, stroke data corresponding to a plurality of strokes that are handwritten, the plurality of strokes comprising a first stroke and a second stroke;
displaying on a screen of a display loci corresponding to the plurality of strokes based on the stroke data, the loci comprising a first locus corresponding to the first stroke and a second locus corresponding to the second stroke;
inserting a blank area between the first locus and the second locus on the screen, in accordance with an input operation of designating a position between the first locus and the second locus; and
if at least one stroke is newly handwritten on the blank area after the blank area is inserted:
displaying on the blank area loci corresponding to the at least one stroke newly handwritten; and
executing, on the condition that a remaining space within the blank area on which no stroke is newly handwritten is larger than a first space, a process of changing the stroke data to move a display position of at least one of the first locus and the second locus to the remaining space.

6. A non-transitory computer-readable medium having stored thereon a computer program which is executable by a computer, the computer program controlling the computer to execute functions of:
storing, in a memory, stroke data corresponding to a plurality of strokes that are handwritten, the plurality of strokes comprising a first stroke and a second stroke;
displaying on a screen of a display loci corresponding to the plurality of strokes based on the stroke data, the loci comprising a first locus corresponding to the first stroke and a second locus corresponding to the second stroke;

inserting a blank area between the first locus and the second locus on the screen, in accordance with an input operation of designating a position between the first locus and the second locus; and if at least one stroke is newly handwritten on the blank area after the blank area is inserted:

displaying on the blank area loci corresponding to the at least one stroke newly handwritten; and executing, on the condition that a remaining space within the blank area on which no stroke is newly handwritten is larger than a first space, a process of changing the stroke data to move a display position of at least one of the first locus and the second locus to the remaining space.

7. The electronic device of claim 1, the processing circuitry to enlarge the blank area, in accordance with a drag operation of moving the position designated by the input operation.

8. The method of claim 5, further comprising displaying on the screen the loci, based on the changed stroke data.

9. The method of claim 5, wherein the blank area is set in a direction corresponding to an arrangement of the first locus and the second locus.

10. The method of claim 5, further comprising deleting a locus designated by another input operation.

11. The method of claim 5, further comprising enlarging the blank area, in accordance with a drag operation of moving the position designated by the input operation.

12. The non-transitory computer-readable medium of claim 6, wherein the computer program further controls the computer to execute a function of displaying the loci, based on the changed stroke data.

13. The non-transitory computer-readable medium of claim 6, wherein the blank area is set in a direction corresponding to an arrangement of the first locus and the second locus.

14. The non-transitory computer-readable medium of claim 6, wherein the computer program further controls the computer to execute a function of deleting a locus designated by another input operation.

15. The non-transitory computer-readable medium of claim 6, wherein the computer program further controls the computer to execute a function of enlarging the blank area, in accordance with a drag operation of moving the position designated by the input operation.

* * * * *